US012080282B2

(12) United States Patent
Teng et al.

(10) Patent No.: US 12,080,282 B2
(45) Date of Patent: *Sep. 3, 2024

(54) NATURAL LANGUAGE PROCESSING USING CONTEXT

(71) Applicant: Amazon Technologies, Inc., Seattle, WA (US)

(72) Inventors: Da Teng, Sammamish, WA (US); Adrian Evans, Lake Tapps, WA (US); Naresh Narayanan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,901

(22) Filed: Jun. 24, 2022

(65) Prior Publication Data
US 2023/0042420 A1 Feb. 9, 2023

Related U.S. Application Data

(63) Continuation of application No. 16/827,025, filed on Mar. 23, 2020, now Pat. No. 11,386,887.

(51) Int. Cl.
*G10L 15/183* (2013.01)
*G10L 15/22* (2006.01)
*G10L 17/22* (2013.01)

(52) U.S. Cl.
CPC ........... *G10L 15/183* (2013.01); *G10L 15/22* (2013.01); *G10L 17/22* (2013.01);
(Continued)

(58) Field of Classification Search
CPC ....... G10L 15/183; G10L 15/22; G10L 17/22; G10L 2015/223; G10L 2015/227;
(Continued)

(56) References Cited

U.S. PATENT DOCUMENTS 8,972,243 B1 3/2015 Strom et al.
9,728,188 B1 8/2017 Rosen et al.
(Continued)

FOREIGN PATENT DOCUMENTS

CN 108141450 A * 6/2018 ......... G06F 17/2705

OTHER PUBLICATIONS

Office Action issued Jan. 13, 2023 in U.S. Appl. No. 16/826,950.
(Continued)

*Primary Examiner* — Abul K Azad
(74) *Attorney, Agent, or Firm* — Pierce Atwood LLP

(57) ABSTRACT

This disclosure proposes systems and methods for processing natural language inputs using data associated with multiple language recognition contexts (LRC). A system using multiple LRCs can receive input data from a device, identify a first identifier associated with the device, and further identify second identifiers associated with the first identifier and representing candidate users of the device. The system can access language processing data used for natural language processing for the LRCs corresponding to each of the first and second identifiers, and process the input data using the language processing data at one or more stages of automatic speech recognition, natural language understanding, entity resolution, and/or command execution. User recognition can reduce the number of candidate users, and thus the amount of data used to process the input data. Dynamic arbitration can select from between competing hypotheses representing the first identifier and a second identifier, respectively.

20 Claims, 16 Drawing Sheets

(52) U.S. Cl.
CPC .. *G10L 2015/223* (2013.01); *G10L 2015/227* (2013.01); *G10L 2015/228* (2013.01)

(58) Field of Classification Search
CPC . G10L 2015/228; G10L 17/00; G06F 40/279; G06F 40/30
See application file for complete search history.

(56) References Cited

U.S. PATENT DOCUMENTS

| | | | |
|---|---|---|---|
| 9,934,777 | B1 | 4/2018 | Joseph et al. |
| 10,049,663 | B2* | 8/2018 | Orr .................... G10L 17/22 |
| 2005/0010420 | A1 | 1/2005 | Russlies et al. |
| 2013/0110509 | A1 | 5/2013 | Cath et al. |
| 2016/0269524 | A1 | 9/2016 | Stottlemeyer |
| 2017/0041388 | A1* | 2/2017 | Tal ....................... G06F 40/279 |
| 2017/0069321 | A1 | 3/2017 | Toiyama |
| 2017/0140759 | A1 | 3/2017 | Kumar et al. |
| 2017/0236512 | A1 | 8/2017 | Williams et al. |
| 2017/0357637 | A1* | 12/2017 | Nell ....................... G06F 3/167 |
| 2017/0357788 | A1* | 12/2017 | Ledvina .................. G06F 21/88 |
| 2018/0272240 | A1 | 9/2018 | Soudek et al. |
| 2018/0335903 | A1 | 11/2018 | Coffman et al. |
| 2019/0318735 | A1 | 10/2019 | Chao et al. |
| 2019/0355352 | A1 | 11/2019 | Kane et al. |
| 2020/0041388 | A1* | 2/2020 | Bansal ................. G01N 1/2273 |
| 2020/0243094 | A1 | 7/2020 | Thomson et al. |
| 2021/0158811 | A1 | 5/2021 | Di Fabbrizio et al. |
| 2022/0107953 | A1 | 4/2022 | Goldstein et al. |

OTHER PUBLICATIONS

U.S. Appl. No. 16/826,950, filed Mar. 23, 2020.
Office Action issued on Sep. 9, 2022 in U.S. Appl. No. 16/826,950, filed Mar. 23, 2020.
Office Action mailed Apr. 10, 2023 for U.S. Appl. No. 16/826,950.

* cited by examiner

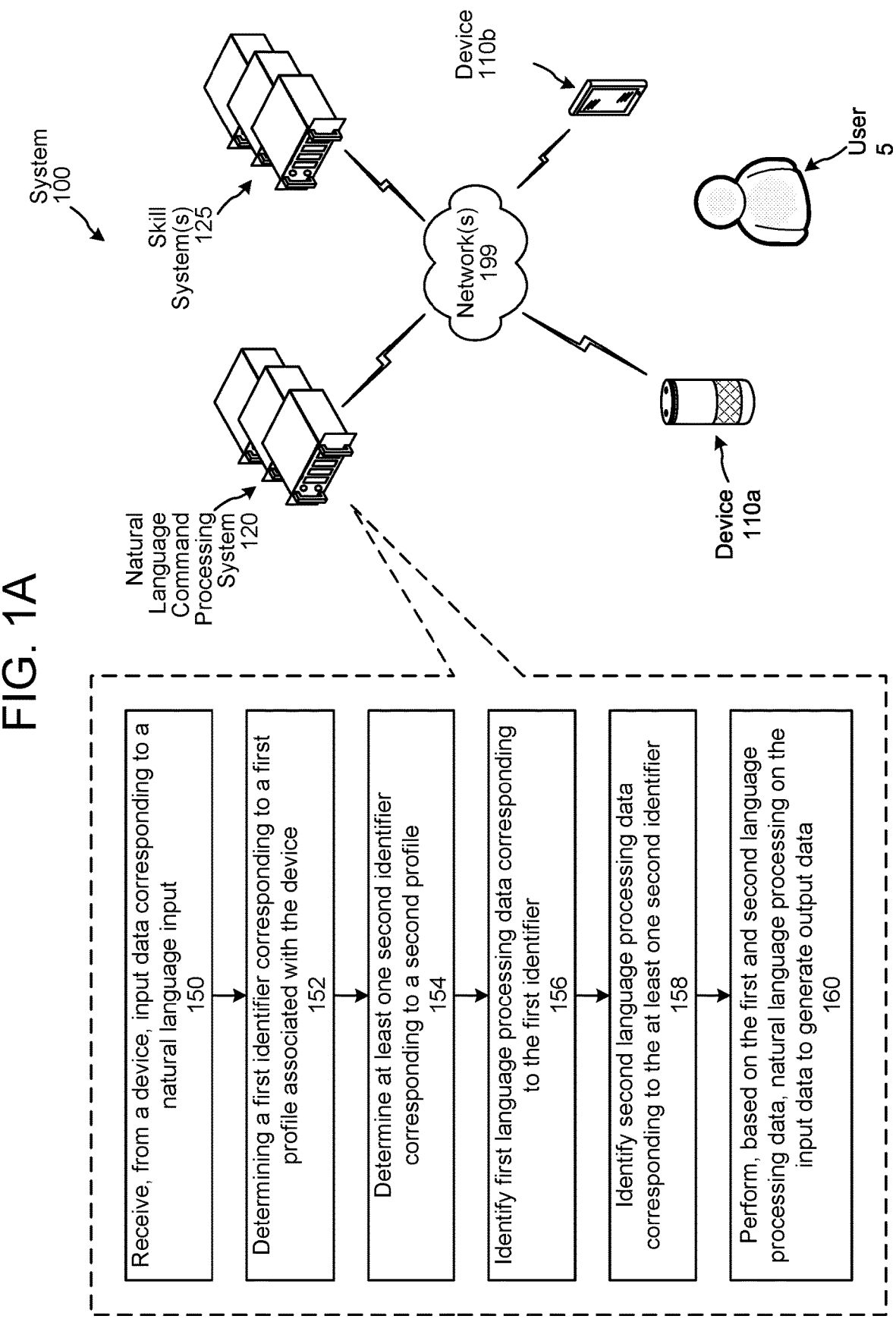

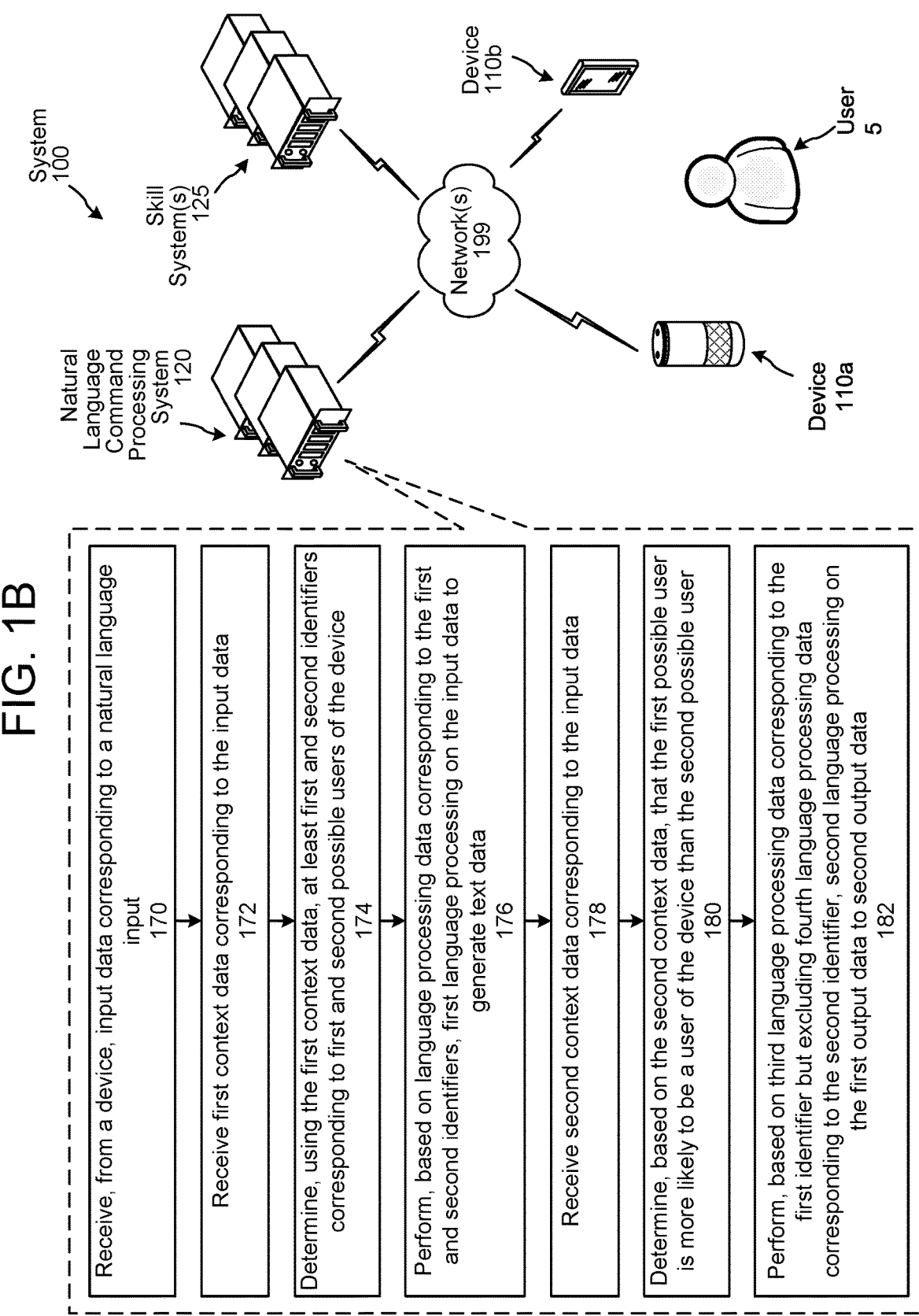

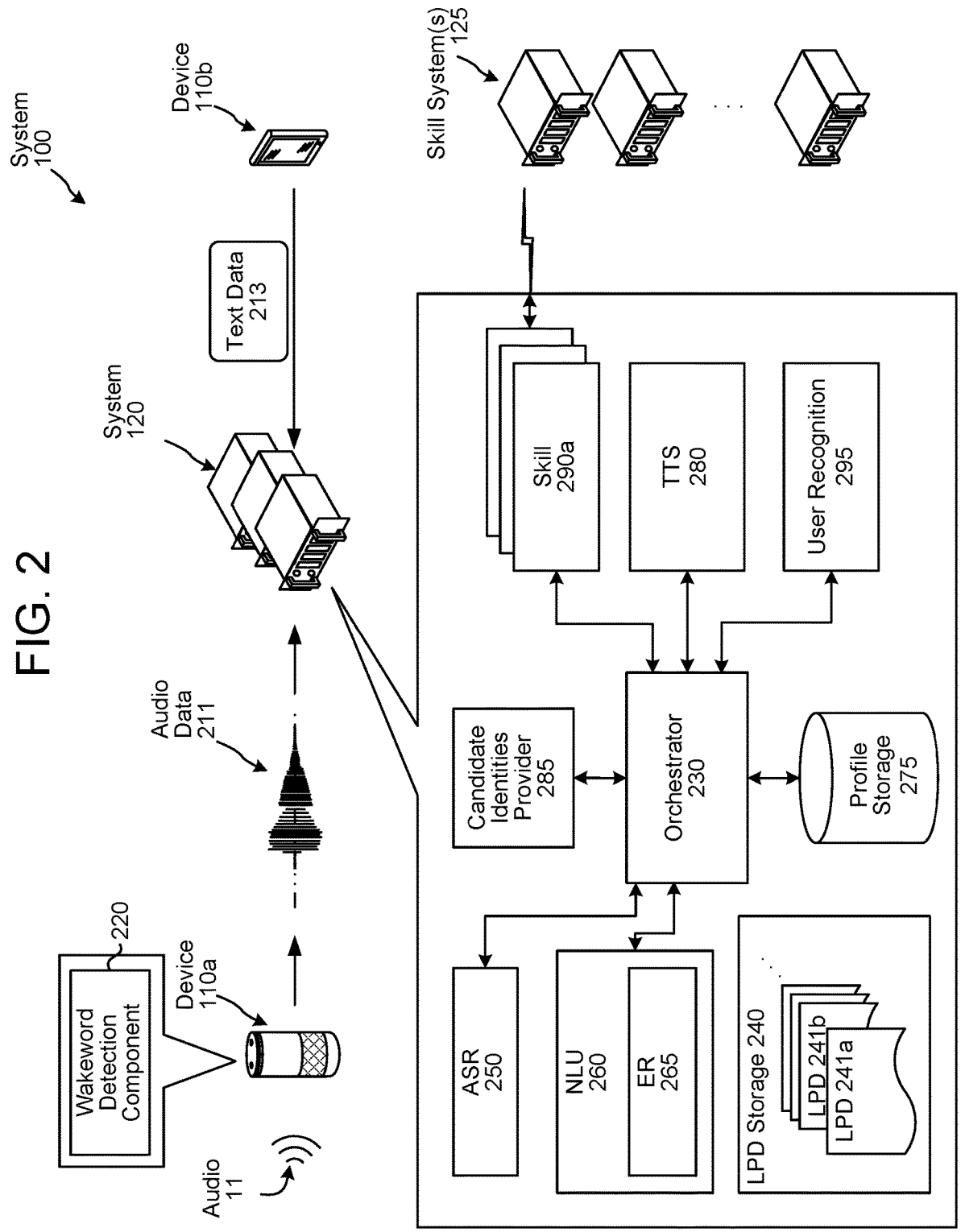

NATURAL LANGUAGE PROCESSING USING CONTEXT

CROSS REFERENCE TO RELATED APPLICATION

This application is a continuation of, and claims priority of U.S. Non-Provisional patent application Ser. No. 16/827,025, filed Mar. 23, 2020, and entitled "NATURAL LANGUAGE PROCESSING USING CONTEXT," scheduled to issue as U.S. Pat. No. 11,386,887, which is herein incorporated by reference in its entirety.

BACKGROUND

Natural language processing systems have progressed to the point where humans can interact with computing devices using their voices and natural language textual input. Such systems employ techniques to identify the words spoken and written by a human user based on the various qualities of a received input data. Speech recognition combined with natural language understanding processing techniques enable speech-based user control of a computing device to perform tasks based on the user's spoken commands. Speech recognition and natural language understanding processing techniques may be referred to collectively or separately herein as natural language processing. Natural language processing may also involve converting a user's speech into text data which may then be provided to various text-based software applications.

Natural language processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system configured to perform language processing using data associated with multiple language recognition contexts, according to first example embodiments of the present disclosure.

FIG. 1B is a conceptual diagram illustrating a system configured to perform language processing using data associated with multiple language recognition contexts, according to second example embodiments of the present disclosure.

FIG. 2 is a conceptual diagram of components of the system, according to embodiments of the present disclosure.

DETAILED DESCRIPTION

Figure 3A:
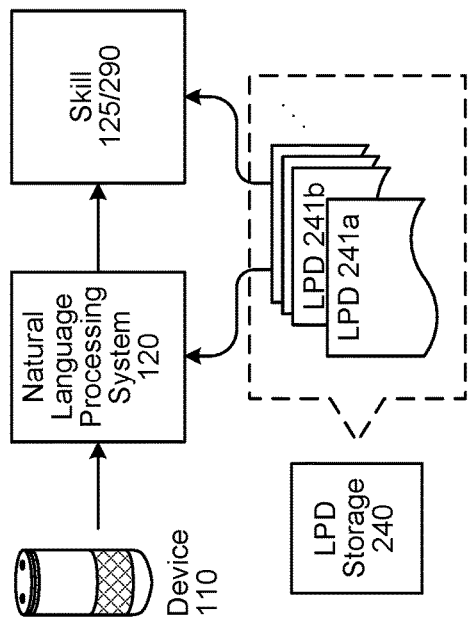
FIGS. 3A and 3B illustrate a high-level view of a platform for language processing using data associated with a single language recognition context, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs in a language spoken by humans). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A system may receive a natural language input. For example, a user may speak a natural language input to a device, and the device may send audio data, representing the spoken natural language input, to the system. When performing ASR, the system may use an acoustic model and a language model. The acoustic model can process audio data to generate text hypotheses that represent acoustic data— i.e., one or more acoustic units such as phonemes—that the ASR processing determines were represented in the audio data. The language model can process the acoustic units to generate ASR output data including text or symbolic data representing possible transcriptions the audio data.

The system may perform NLU processing on the ASR output data to perform a semantic analysis of the ASR output data determine an intent of the spoken natural language input as well as portions of the ASR output data that may be used to perform an action responsive to the spoken natural language input. For example, NLU processing may include determination of an intent (e.g., an action desired by the user), named entity recognition (NER) (e.g., identifying what portions of the ASR output data refer to entities relevant to the command), and entity resolution (ER) (e.g., names or other information that are objects of the intent).

ASR and NLU are performed with the aid of language processing data (LPD), which can include one or more trained models or other resources (such as ASR models, NLU models, entity lists, content catalog data, etc.). Typically, a natural language processing system employs various LPD resources for interpreting natural language inputs. The different LPD may be universal (such as a universal ASR or NLU model that may be used across many users who speak the same language) or may be customized (such as a particular ASR model, NLU model, or entity list that is associated with a group profile). Such customized LPD resources are commonly with an account or profile linked to one or more devices. Performance of such a system may, however, be limited in its ability to tailor its operation to specific users if multiple users use a device and/or are associated with a single account. For example, the ASR process may output an erroneous transcript due to using a language model not specific to the particular user. Further, if a user has different language habits in one context (for example in the car) than in another (for example at home), then the system may also be limited in its ability to adjust to these habits. NLU, ER, and other operations may similarly be unable to sufficiently customize their operations in specific circumstances. For example, if a user interacts with different playlists, shopping or browsing histories, or contact lists in different circumstances, a natural language processing system may have difficulty responding promptly and accurately to user requests, particularly to user requests that involve consideration of language or context particular to the user.

The present disclosure proposes a solution to the problems stemming from the use of communal LPD by providing an architecture that allows for grouping of LPD that are likely to be used in similar situations or other type of contexts. These LPD resources may thus be organized and based on the situation/context corresponding to the particular natural language input. Such a context may be referred to as a language recognition context (LRC). The LRC is the context under which a language input is processed and recognized. A particular LRC may correspond to, for example, a specific user in a certain situation such as driving a car or at home in the evening, or acting as a guest user in a household other than their own. The LPD resources associated with the particular LRC may correspond to data used by the language processing system in that particular context. For example, if a user is likely to use certain comments while in a car, the LPD resources for the LRC of the user in the car may be tuned/specially configured to process language inputs that are likely to be received while the user is in the car. In another example, if a different user is likely to use certain commands while at home, the LPD resources for the LRC of that other user at home may be tuned/specially configured to process language inputs that are likely to be received while that other user is at home. The LRC may be associated with specific LPD such as one or more LPD components, which serve as resources for natural language processing including speech recognition and NLU; for example, a personal catalog, a language model, entity resolution data, enabled skills, linked accounts, etc. The data may be in different forms such as customized classifiers, specially weighted finite state transducers (FSTs), or the like.

For example, in the context of ASR, the natural language processing system can determine a set of one or more candidate users, each having a candidate identifier, and load a personalized LRC for each. The LRCs can be of different types; for example and without limitation: communal, personal, or roaming, with each type offering a different experience. Each LRC can include an acoustic model and/or language model specific to the particular candidate user. In some implementations, the system can employ a user recognition function, which can reduce the number of initial candidate users under consideration, thus reducing the number of LRCs referenced for downstream processing. For example, during ASR, the user recognition function can associate the input data with a particular user, or set of users comprising a subset of the initial candidate users. Thus, the NLU stage can perform NLU functions using LPD components associated with a smaller number of LRCs, thus reducing the computing resources required. Resolving entities and executing the command using a skill can similarly benefit from the reduced number of LRCs while still providing improved, personalized service based on user-specific context (such as settings and preferences) leveraged by the skill, such as playlists or contact lists. At runtime, customized LPD for the appropriate LRC may be used to process the natural language input. The custom LPD may be used alone and/or in combination with generalized LPD, for example LPD associated with a group or household profile, LPD for a large population (e.g., a base language model), or the like.

FIG. 1A is a conceptual diagram illustrating a system 120 configured to perform language processing using data associated with multiple language recognition contexts, according to first example embodiments of the present disclosure. Although the figures and discussion of the present disclosure illustrate certain steps in a particular order, the steps described may be performed in a different order (as well as certain steps removed or added) without departing from the present disclosure. As shown in FIG. 1A, the system 100 may include one or more devices 110a and 110b (collectively "devices 110") (local to a user 5), a natural language command processing system 120 (abbreviated "system 120"), and one or more skill systems 125 connected across one or more networks 199. While the user 5 is illustrated as being a human, other types of users (e.g., computing systems) may exist.

The device 110a may receive audio corresponding to a spoken natural language input originating from the user 5. The device 110a may generate audio data corresponding to the audio, and may send the audio data to the system 120. The device 110a may send the audio data to the system 120 via an application that is installed on the device 110a and associated with the system 120. An example of such an application is the Amazon Alexa application that may be installed on a smart phone, tablet, or the like. Similarly, the device 110*b* may receive text data corresponding to a natural language input originating from the user 5, and send the text data to the system 120 (the device 110*b* may also receive audio, generate audio data corresponding to the audio, and send the audio data to the system 120). Examples of various devices 110 are further illustrated in FIG. 15. In some implementations, users may have different or modified LRCs for different devices, even if the devices are associated with the same group identifier or personal identifier.

The system 120 can receive, from a device, input data corresponding to a natural language input (150). The system 120 can determine a first identifier corresponding to a first profile associated with the device (152). The system 120 can determine at least one second identifier corresponding to a second profile (154). The system 120 can identify first language processing data corresponding to the first identifier (156). The system 120 can identify second language processing data corresponding to the at least one second identifier (158). The system 120 can perform, based on the identified language processing data, natural language processing on the input data to generate output data (160).

The system 120 can receive, from the device, input data corresponding to a natural language input (150). The system 120 can receive the input data from a device 110, such as any of the devices 110 shown in FIG. 15. The input data can include text data corresponding to a natural language input and/or audio data corresponding to an utterance (e.g., a spoken request or command). In some implementations, the device can receive additional data from the device including presence data regarding the location of uses/devices, for example other users and/or devices proximate to the device. Such presence data can be based on presence signals such as those from currently or previously connected Bluetooth or Wi-Fi devices, roaming session active/inactive signals such as when a guest user logs into a personal account using the device, and/or face recognition signals from camera-equipped devices.

The system 120 can determine a first identifier corresponding to a first profile associated with the device (152). The system 120 can determine the first identifier based on data received the first identifier from the device 110 or from elsewhere, such as a memory of the system maintaining a state associated with the device 110. The first identifier can be, for example, an account identifier or group identifier associated with the device. For example, the first identifier can correspond to an account profile to which the device is registered or otherwise linked.

The system 120 can determine at least one second identifier corresponding to a second profile (154). The second profile can be different from the first profile. The system 120 can refer to a candidate identities provider, such as the candidate identities provider 285 described below, to retrieve a list of one or more second identifiers associated with the first identifier. For example, the first identifier may be an identifier associated with the household where the device 110 is registered, a group of users that the device 110 services, or an account to which the device 110 is registered. The second identifiers may be personal identifiers for known members of the household, group, or account. In some implementations, the system 120 may retrieve additional identifiers from the candidate identities provider. For example, if the system 120 receives an indication that the device is operating in a roaming mode—that is, servicing a temporary or guest user who may not be a member of the household, but who seeks to access some of his/her libraries or preferences—the system may determine that one or more of the second identifiers is a roaming identifier, from the device 110. In some implementations, the system 120 can receive from the device 110 credentials entered by the user. The credentials can establish identity and/or permission to use the device 110 and/or access personalized data stored by the system 120. For example, the credentials may authorize, verify, or otherwise associate the user with the second profile. The system 120 may grant a temporary association between the first profile and the second profile. The credentials can include identifying information such as voice or face recognition, a username and password login, two-factor authentication using a second device previously associated with the second profile, or a one-time pin. In some implementations, the credential can be verified by another user known to be a member of the group or otherwise previously associated with the first profile. The association can be of limited duration; for example, for a single command, for one minute, 30 minutes, 2 hours, 24 hours, or other reasonable amount of time.

In some implementations, the system 120 can use context data to determine additional identifiers. The context data can include the time of day, location of the device, the room (or house) in which the device is located, whether the receiving and/or the requested device is in the home or office, whether the device or user is currently in a car, the type of device, and/or the presence data indicating the presence and/or identities of one or more additional people proximate to the device, etc.

The system 120 can identify first language processing data corresponding to the first identifier (156) and second language processing data corresponding to the at least one second identifier (158). The system 120 can use the identifiers to retrieve corresponding language processing data (LPD). Each identifier can be associated with corresponding LPD. The system can access the LPD in a LPD storage, such as the LPD storage 240 described further below. Each LPD may consist of one or more LPD components, where each component can be used to perform a different stage of natural language processing or command execution, as described further below with reference to FIGS. 3A-3D. The LPD identified can include respective LPD instances corresponding to the first identifier and the at least one second identifiers. In some implementations, the system 120 can additionally use the context data to selected LPD for processing the natural language input. For example, the system 120 may maintain multiple LPD instances for a user, and select certain LPD to process a command received from a user at work, but select different LPD to process a command received from the same user at home. In implementations where the user presents credentials to the device 110, the system 120 may identify the second language processing data subject to or contingent upon verifying the credentials.

The system 120 can perform, based on the identified language processing data, natural language processing on the input data to generate output data (160). For spoken inputs, the system 120 can perform automatic speech recognition (ASR) processing and natural language understanding (NLU) processing. Each LPD may include separate components for ASR and NLU, respectively. In particular, a LPD corresponding to a personal identifier may include an ASR component and an NLU component. Each LPD component can include a trained model trained based on data including natural language inputs associated with the particular user. Similarly, LPD associated with a group identifier may include ASR data and NLU data, each trained based on natural language inputs associated with the group identifier (e.g., utterances received from users in the household). Each LPD may additionally include an entity resolution (ER) component including a library of entities associated with the identifier corresponding to the LPD, as well as skill data that can include settings, preferences, and libraries useable by a skill for servicing requests associated with the identifier. In some implementations, each LPD may include fewer or more components. Some LPD components may be combined, and other components may be subdivided into further components. The system 120 may process the input data among multiple LPD components corresponding to respective identifiers in parallel, or the system 120 may merge the LPD components. The system 120 may merge the LPD components prior to runtime (i.e., based on known personal identifiers associated with a group identifier to which a natural language device is registered) or at runtime when input data is received. The result of the natural language processing can be output data, which the system 120 can then send to an application, skill, or skill system for processing.

In some implementations, the system 120 may apply user recognition techniques to the input data to narrow the number of LPD instances used to process the input data. Such narrowing can reduce the search space necessary for processing the input data, resulting in less use of computing resources, faster processing, and/or more accurate results. For a spoken input, the system 120 may not be able to perform user (voice) recognition prior to performing ASR; however, the system 120 may be able to perform user recognition in parallel with ASR. User recognition may output an n-best list of most likely identities of the speaker. Based on the list, the system 120 may remove identifiers from among the second identifiers. While the system 120 may perform ASR processing on the input data using LPD instances corresponding to all of the second identifiers, the system 120 may be able to, prior to performing NLU processing, eliminate one or more of the second identifiers based on the n-best list generated by the user recognition process. The system 120 can thus perform NLU processing using only a subset of the LPD instances used for the ASR processing. For example, the system 120 may perform ASR processing using eight ASR models, but may perform NLU processing using four NLU models instead of the full eight. Downstream processing such as ER and skill execution would also benefit from the reduced search space.

In some implementations, the ASR and NLU processing may result in competing hypothesis associated with a group identifier and a personal identifier, respectively. For example, a first hypothesis corresponding to a group identifier and a second hypothesis associated with a personal identifier may have equal or nearly equal confidence scores. For example, a user may request a playlist where a playlists having the same name are associated with both the personal identifier and the group identifier. Other examples where arbitration may be helpful are when a user makes a reference to a song, contact, or smart home appliance with non-unique names. In such cases, the system 120 may employ a process of dynamic arbitration to determine which hypothesis is more relevant based on environmental information such as the time of day, location of the device, the room (or house) in which the device is located, whether the receiving and/or the requested device is in the home or office, whether the device or user is currently in a car, the type of device, or presence data indicating the presence and/or identities of one or more additional people in the room, etc. The dynamic arbitration process may determine, based on the environmental information, that the input data has greater relevance to the group identifier than to the at least one of the plurality of personal identifiers. The system 120 can thus output data to a skill or skill system for executing a command corresponding to the first hypothesis.

Following the natural language processing, the system 120 can send the output data to a skill (or skills system or application) configured to execute the output data. The skills—for example, skill 290 or skill system 125—may also leverage the LPD in responding to the output data. For example, the output data may include one or more identifiers associated with the leading hypothesis (alternatively, the identifier may be transmitted to the skill separately from the output data). The LPD associated with each identifier may include skill data, which may also include settings, preferences, and libraries useable by a skill for servicing requests associated with the identifier. The skill may thus respond to the system 120 with information relevant to the identifier; such as providing weather in the user's preferred units, streaming video from the user's preferred provider, etc.

FIG. 1B is a conceptual diagram illustrating a system configured to perform language processing using data associated with multiple language recognition contexts, according to second example embodiments of the present disclosure. The system 100 of FIG. 1B can be the same as or similar to the system of FIG. 1A and perform similar operations, and is added to illustrate additional example processes. In particular, the system 100 includes the natural language command processing system 120, the skill systems 125, and devices 110 communicating over a network 199. A user can interact with the system 120 and the skill systems 125 via the devices 110. Although FIG. 1B illustrates certain steps in a particular order, the steps described may be performed in a different order (as well as certain steps removed or added) without departing from the present disclosure.

The system 120 can receive, from a device, input data corresponding to a natural language input (170). The system 120 can receive first context data corresponding to the input data (172). The system 120 can determine, using the context data, at least a first identifier corresponding to a first possible user of the device and a second identifier corresponding to a second possible user of the device (174). The system 120 can perform, based on first language processing data corresponding to the first identifier and second language processing data corresponding to the second identifier, first language processing on the input data to generate first output data (176). The system 120 can receive second context data corresponding to the input data (178). The system 120 can determine, based on the second context data, that the first possible user is more likely to be a user of the device than the second possible user (180). The system 120 can perform, based on third language processing data corresponding to the first identifier but excluding fourth language processing data corresponding to the second identifier, second language processing on the first output data to second output data (182).

The system 120 can receive, from a device, input data corresponding to a natural language input (170). The system 120 can receive the input data from a device 110, such as any of the devices 110 shown in FIG. 15. The input data can include a natural language input such as text data and/or audio data corresponding to an utterance (e.g., a spoken request or command).

The system 120 can receive first context data corresponding to the input data (172). The system can receive, either from the device 110 or elsewhere including a memory or storage of the system 120, context data including information regarding the device, the input data, presence data, environmental information, etc. In some implementations, the context data can include credentials of a user such as login credentials or a two-factor authentication code. In some implementations, the system 120 can receive presence signals such as those from currently or previously connected Bluetooth or Wi-Fi devices, roaming session active/inactive signals such as when a guest user logs into a personal account using the device, etc.

The system 120 can determine, using the context data, at least a first identifier corresponding to a first possible user of the device and a second identifier corresponding to a second possible user of the device (174). The first and second identifiers may be determined by their association with a group identifier associated with the device identifier. The first and second identifiers may be determined based on the device 110 detecting the presence of a personal device associated with the first and/or the second identifier. The first and/or second identifiers may be determined based on validating the credentials in the first context data received by the device 110. The first and/or second identifiers can corresponding to possible users who may have provided the input data to the device 110. If the list of possible users determined from the first context data is large, however, the list of possible users determined from the second context data may still be smaller, even if a new possible user is added.

The system 120 can perform, based on first language processing data corresponding to the first identifier and second language processing data corresponding to the second identifier, first language processing on the input data to generate first output data (176). The system 120 can identify language processing data corresponding to each of the identifiers determined in the previous step. The language processing data can include trained model data corresponding to each user or group corresponding to the identifiers. The language processing data can include acoustic models, language models, classifiers, libraries, lexicons, etc.

The system 120 can receive second context data corresponding to the input data (178). The second context data may include data similar to that contained in the first context data, as well as additional context data generated, determined, or received during the first language processing steps. For example, a user recognition process can generate user recognition data based on voice or face recognition.

The system 120 can determine, based on the second context data, that the first possible user is more likely to be a user of the device than the second possible user (180). Based on the second context data, the system 120 may be able to narrow or shrink the list of possible users, thereby reducing the search space for performing downstream language processing functions. For example, the system 120 can use the user recognition data to determined that one of the possible users whose language processing data was leveraged in performing the first natural language processing is likely not the user who provided the input data. Thus, language processing data associated with that user need not be used in the second language processing.

The system 120 can perform, based on third language processing data corresponding to the first identifier but excluding fourth language processing data corresponding to the second identifier, second language processing on the first output data to second output data (182). In some implementations, the second language processing is based on a reduced search space relative to the first language processing. In some implementations, however, user recognition data contained in or determined from the second context data may indicate that the input was provided by a user other than one of the possible users identified based on the first context data. In such cases, the system can perform the second language processing based additionally on language processing data corresponding to the new user.

The system 100 may operate using various components as described in FIG. 2. The various components may be located on a same or different physical devices. Communication between various components of the system 100 may occur directly or across a network(s) 199. Communications between the internal components of the system 120 are described further below with reference to FIGS. 4 and 5.

A system such as the system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2 is a conceptual diagram of components of the system 100, according to embodiments of the present disclosure. As shown in FIG. 2, an audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the system 120. An example wakeword is "Alexa." As used herein, a "wakeword" may refer to a single word or more than one consecutive words in speech. The system may also be configured to recognize different wakewords such as "Alexa" and "House" where a first wakeword may invoke different functionality/a different speech processing system from a second wakeword.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio data 211, to the system 120. The audio data 211 may include data corresponding to the wakeword, or the device 110a may remove the portion of the audio corresponding to the wakeword prior to sending the audio data 211 to the system 120.

Figure 4:
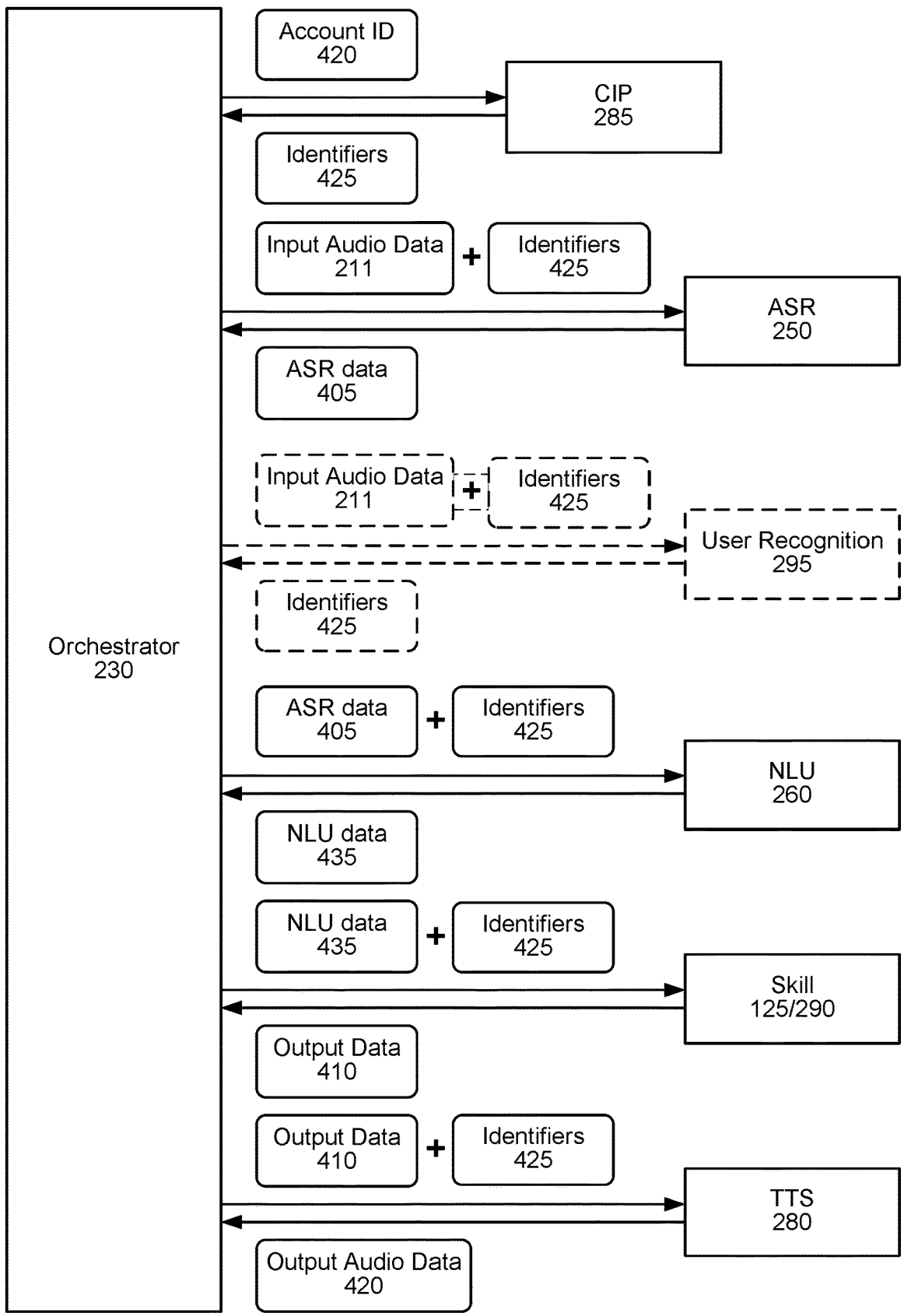
FIG. 4 is a conceptual diagram illustrating how a natural language input may be processed at runtime, according to embodiments of the present disclosure.

The system 120 may include an orchestrator 230 configured to receive the audio data 211 (and optionally and assistant identifier corresponding to the device 110a) from the device 110a. The orchestrator 230 may include memory and logic that enables the orchestrator 230 to transmit various pieces and forms of data to various components of the system 100, as well as perform other operations. For example, as shown in FIG. 4 discussed in more detail below, the orchestrator 230 may send the audio data 211 to an ASR component 250 (conceptually illustrated in FIG. 6 and discussed below), may receive text and acoustic data from the ASR component 250 and forward them to an NLU component 260 (conceptually illustrated in FIGS. 7 and 8 and discussed below). The NLU component 260 may also include an entity resolution (ER) component 265, as discussed further below. The orchestrator 230 may receive the NLU results data from the NLU component 260 and forward them to a skill 290 and/or a skill system 125. The orchestrator 230 may receive output data 410 from the skill 290 and/or skill system 125 and cause performance of one or more actions in response to the input audio data 211. In some implementations, the orchestrator 230 can forward the output data 410 to the TTS component 280 for generating a spoken-word response to the input audio data 211. In some implementations, the orchestrator 230 may provide the set of identifiers 425 to the TTS 280. The TTS 280 may use the identifiers 425 to, for example, provide the user/users with a preferred language or voice output. The orchestrator 230 may receive output audio data 420 from the TTS component 280, and may transmit the output audio data back to the device 110a for output to the user 5.

The system 120 may include one or more skills 290a, etc. (collectively "skills 290"). A skill may be software running on the system 120 that is akin to a software application running on a traditional computing device. That is, a skill 290 may enable the system 120 to execute user commands involving specific functionality in order to provide data or produce some other requested output. The system 120 may be configured with more than one skill 290. For example, a weather service skill may enable the system 120 to provide weather information, a car service skill may enable the system 120 to book a trip with respect to a taxi or ride sharing service, a restaurant skill may enable the system 120 to order a pizza with respect to the restaurant's online ordering system, etc. A skill 290 may operate in conjunction between the system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The system 120 may be configured with a single skill 290 dedicated to interacting with more than one skill system 125.

Unless expressly stated otherwise, reference herein to a "skill" may include a skill 290 operated by the system 120 and/or skill operated by a skill system 125. Moreover, the functionality described herein as a skill may be referred to using many different terms, such as an action, bot, app, application, or the like.

Referring again to FIG. 2, after receiving the NLU results data 435, the orchestrator 230 may send the NLU results data 435 to a skill system 125. The system 120 may communicate with a variety of skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The system 120 may include a TTS component 280. The TTS component 280 may generate audio data (e.g., synthesized speech) from text data using one or more different methods. Text data input to the TTS component 280 may come from a skill system 125, the orchestrator 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include a user recognition component 295. In at least some embodiments, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output user recognition data indicating a single user or voice identifier corresponding to the most likely user that originated the natural language input. Alternatively, the user recognition data may indicate multiple user or voice identifiers (e.g., in the form of an N-best list) with respective values representing likelihoods of respective users originating the natural language input. The user recognition data may be used to inform NLU processing, processing performed by a skill system 125, as well as processing performed by other components of the system 120 and/or other systems.

In some implementations, however, the user recognition component 295 may be turned off, inactive, or otherwise not engaged to perform user recognition. In such cases, the natural language processing system may assign input audio data to a default account, or a user or group account associated with the device 110, or otherwise determine a user/group account to which to assign incoming data. Further details of the operation of the user recognition component 295 are described below with reference to FIGS. 9 through 12.

The system 120 may include profile storage 275. The profile storage 275 may include a variety of information related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 275 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the system 120 with permission to allow the skill system 125 to execute with respect to the user's natural language inputs. If a user does not enable a skill system 125, the system 120 may not invoke the skill system 125 to execute with respect to the user's natural language inputs.

The profile storage 275 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 275 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

The system 120 includes a candidate identities provider (CIP) 285. For a given input, whether in the form of audio data 211 or text data 213, the CIP 285 can provide the system 120 with a list of one or more possible identities or identifiers corresponding to the input. In one manner of operation, the CIP 285 can provide the system 120 with information on relationships between identifiers. For example, the CIP 285 can provide the system 120 with associations between a group identifier (or an account identifier) and one or more personal identifiers (i.e., identifiers identifying individuals). The CIP 285 can maintain information about guest users of a device 110. For example, the CIP 285 can store information related to a temporary or guest signing into an account on the device 110; for example, when a user selects or requests a roaming experience on the device 110. A roaming experience may include use of a household device by a guest user who is not a usual member of the house, or use of a "public" device such as a voice-activated device in a hotel or other public place. The CIP 285 can store the guest identifier (e.g., a roaming identifier) as well as any associated identifiers; for example, if the guest sign in corresponds to a group identifier different from the group identifier to which the device 110 is registered, the CIP 285 can store any personal identifiers associated with the guest identifier. At runtime, the orchestrator 230 may provide the CIP 285 with an account identifier 420 associated with input data, and the CIP 285 can respond with a list of one or more identifiers 425 representing possible users who may have issued the input data. In some implementations, the CIP 285 may be able to reduce the number of candidates based on the output of the user recognition component 295. In some implementations, the CIP 285 can provide candidates based on the user and/or group profiles stored in the profile storage 275. In some implementations, the CIP 285 may be able to provide a list of candidate identifiers based on other inputs; for example, context data including the time of day, location of the device, the room (or house) in which the device is located, whether the receiving and/or the requested device is in the home or office, whether the device or user is currently in a car, the type of device, the presence or identities of one or more additional people in the room, credentials presented by the user, etc. In some implementations, the CIP 285 may provide personal identifiers that depend on the context data; for example, an individual may be associated with multiple personal identifiers, each of the different personal identifiers corresponding to the same individual bit in a different context; for example at work, home, or driving. In some implementations, the CIP 285 can provide identifiers that correspond to a particular context rather than to a particular individual or group. For example, a context identifier could correspond to an LPD corresponding to public use for when, for example, a household is hosting a party.

The system 120 includes a language processing data (LPD) storage 240. Although illustrated as its own component, LPD storage 240 may be associated with other components. For example, LPD storage 240 may be stored within profile storage 275, or with another component. In another configuration LPD storage 240 may not necessarily be centralized, but rather different LPD components may be stored with their respective components (e.g. ASR data stored with ASR storage 652, NLU data stored with NLU storage 773, ER data stored with entity library 782, skill data stored with a skill 290, etc.) and the individual LPD activated/used when the appropriate LRC is determined. The LPD storage 240 can stored LPD 241a, 241b, etc. (collectively "LPD 241" or "LPD instances 241") used for natural language processing and other operations related to servicing requests and commands received from users via the devices 110. The LPD 241 can include finite state transducers, classifiers, libraries, preferences, settings, and related data. The LPD 241 can include multiple components, each applicable for different stages of processing commands; for example, ASR data, NLU data, entity libraries, etc. Each LPD 241 can be associated with an identifier corresponding to an identifier stored in the CIP 285 and/or the profile storage 275. The LPD storage 240 and LPD 241 are described further below with reference to FIGS. 3A-3D.

FIGS. 3A through 3D compare high-level views of platforms for language processing using data associated with a single language recognition context versus using data associated with multiple language recognition contexts, in the context of spoken language, according to embodiments of the present disclosure. FIG. 3A shows a device 110 providing input to the natural language command processing system 120. The system 120 processes the input using language processing data (LPD) 241, which may be stored in, retrieved from, or otherwise accessible via the profile storage 275. The system 120 provides the output of the natural language command processing to a speechlet, skill, or application (represented here as "skill 125/290") for execution.

Figure 3C:
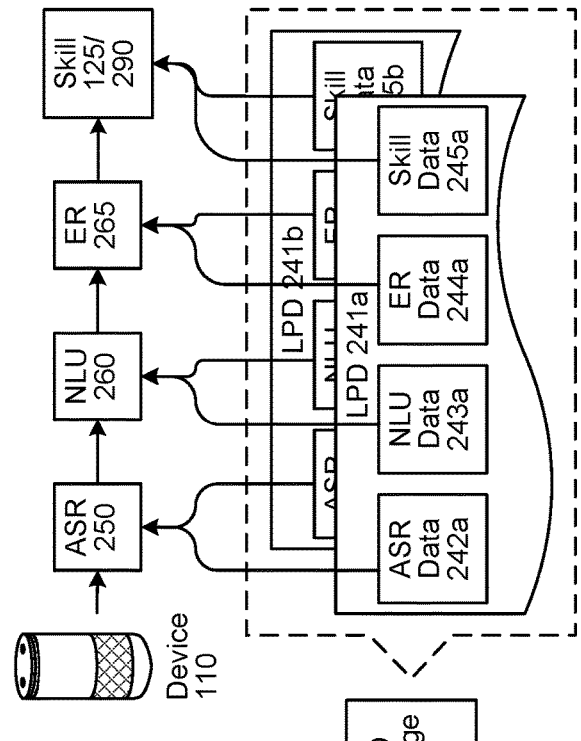
FIGS. 3C and 3D illustrate a high-level view of a platform for language processing using data associated with multiple language recognition contexts, used in the context of spoken language, according to embodiments of the present disclosure.
Figure 3B:
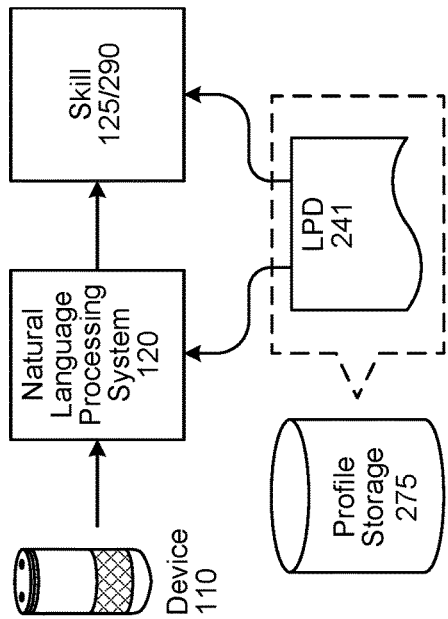

In more detail, FIG. 3B shows natural language command processing by the system 120 in more detail. For a spoken input, natural language command processing begins with processing by an automatic speech recognition (ASR) component 250 of the input audio data representing the spoken input. The output of the ASR component 250 may be ASR output including text or symbolic data representing a transcript of the spoken input. Alternatively, the system 120 can receive input data from the device 110 in the form of text data. The text data is provided to the natural language understanding (NLU) component 260 for processing including determining an intent corresponding to the input data as well as recognizing one or more slots representing entities represented in the input data. The entity resolution (ER) component 265 resolves these entities. The output data following ASR, NLU, and ER can be sent to a skill 125/290 for execution. One or more components of the system 120 may leverage one or more LPD components in its processing. For example, the ASR component 250 may leverage ASR data 242, including one or more of an acoustic model or a language model; the NLU component 260 may leverage NLU data 243 including intent classifiers and/or libraries of grammars and/or intents; the ER component 265 may leverage ER data 244 including libraries of entities; and the skill 125/290 may leverage skill data 245 including playlists, contact lists, usage history, etc.

As described previously, however, processing natural language inputs using LPD 241 corresponding to only a single account may function poorly when used multiple users. At each stage of the natural language command processing, context unspecific to the user who issued the command may result in erroneous transcription, resolution, or execution.

The present disclosure therefore proposes a solution to the problems stemming from the using LPD 241 corresponding to only a single account by providing an architecture that allows for use of multiple instances of LPD 241, each corresponding to a different account or identifier, during one or more stages of ASR, NLU, and execution of the command by a skill/speechlet/application. FIG. 3C illustrates a high-level view of such a system. As in 3A, the device 110 provides input data to the natural language command processing system 120. Rather than retrieving a single LPD 241 instance from the profile storage 275, however, the system 120 can retrieve multiple instances of LPD 241a, 241b, etc. (collectively "LPD 241" or "LPD instances 241"). The LPD instances 241 can respectively represent different users, groups of users, a roaming user, or a combination of individuals, groups, and roaming accounts. The multiple PDS 241 instances may be leveraged during command processing at the skill 125/290 as well; for example, by compiling one or more user- or group-specific contacts profiles in a contact list, rather than attempting to execute contact using a single general purpose contact list.

Figure 3D:
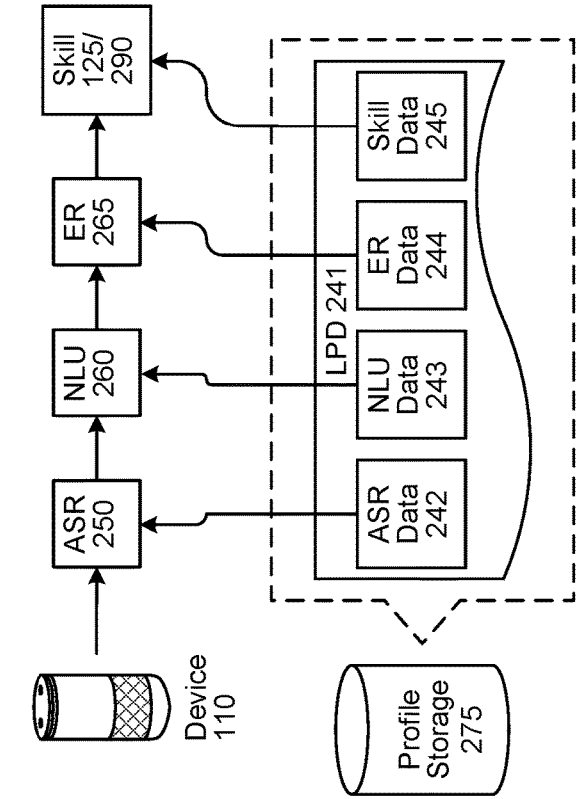

FIG. 3D shows the operation of the system 120 in more detail, including the LPD component used at each stage of natural language command processing. Similar to the flow shown in FIG. 3B, the ASR component 250 may use multiple instances of ASR data 242a, 242b; the NLU component 260 may use multiple instances of NLU data 243a, 243b; the ER component 265 may use multiple instances of ER data 244a, 244b; and the skill 290 may use multiple instances of skill data 245a, 245b. In some implementations, each component of the system 120 need not load the entire set of LPD instances 241. For example, the system 120 may include a user recognition component 295 that can determine one or more likely users who may have provided the input data. User recognition may be performed in parallel with ASR. Thus, between ASR and NLU, the system 120 may be able to reduce the number of candidate users, and thus reduce the number of LPD components 241 used by the NLU component 260, thus reducing the search space and conserving computing resources. Downstream processes at the ER component 265 and skill 125/290 may benefit from similar savings.

FIG. 4 is a conceptual diagram illustrating how a natural language input may be processed at runtime, according to embodiments of the present disclosure. FIG. 4 illustrates the operation of the system 120 from the prospective of an orchestrator 230. After the orchestrator 230 receives the audio data 211 corresponding to a spoken natural language input, the orchestrator 230 may receive an account identifier 420 associated with the device, and send the account identifier 420 to a candidate identities provider (CIP) 285. The CIP 285 may return to the orchestrator 230 a set of identifiers 425 associated with the account identifier 420; for example, the set of identifiers 425 may include personal identifiers associated the household corresponding to the account identifier 420. The set of identifiers 425 may additionally include the account identifier 420. The orchestrator 230 may send the set of identifiers 425 along with the audio data 211 to the ASR component 250. The ASR component 250 can transcribe audio data into one or more ASR hypotheses embodied in ASR output data 405 (e.g., one or more different textual or symbolic representations of the speech contained in the audio data) based on language processing data (LPD) corresponding to the set of identifiers 425. The ASR output data 405 (a ranked list of ASR hypotheses or the top-scoring ASR hypothesis when multiple ASR hypotheses are generated for a single natural language input) may be used by various components of the system 120 for various purposes. A top-scoring ASR hypothesis (and/or other ASR hypotheses), which includes the text or symbolic data corresponding to the most likely transcription of the audio data 211 may be sent from the ASR component 250 to the orchestrator 230. Further details of the operation of the ASR component 250 are described below with reference to FIG. 6. The orchestrator 230 may send the ASR output data 405 along with the set of identifiers to the NLU component 260.

In some implementations, the system 120 may use a user recognition component 295 to narrow the list of candidate users; that is, eliminate one or more identifiers from the set of identifiers 425. The orchestrator 230 can send the input audio data 211 to the user recognition component 295 for processing. In some implementations, the orchestrator 230 may provide the user recognition component 295 with additional data, such as the set of identifiers 425 or other data related to the input audio data 211. The user recognition component 295 may return a single identifier or an n-best list of identifiers, possibly with a confidence value associated with each. For simplicity sake, in FIG. 4, the user recognition component 295 is shown returning the set of identifiers 425, even though the set of identifiers 425 may have changed based on the user recognition processing.

The NLU component 260 can receive the ASR output data 405 and the set of identifiers 425. The NLU component 260 can interpret the ASR output data 405 into one or more NLU hypotheses embodied in NLU data 435 (e.g., one or more different intents and entities contained in the transcribed audio data 211) based on LPD 241 corresponding to the set of identifiers 425. The NLU data 435 (a ranked list of NLU hypotheses or the top-scoring NLU hypothesis when multiple NLU hypotheses are generated for a single natural language input) may be used by various components of the system 120 for various purposes. A top-scoring NLU hypothesis (and/or other NLU hypotheses), which includes the intent and entity data corresponding to the most likely interpretation of the audio data 211 may be sent from the NLU component 260 to the orchestrator 230. Further details of the operation of the NLU component 260 are described below with reference to FIGS. 7 and 8.

The orchestrator 230 may send the NLU data 435 along with the set of identifiers 425 to a skill 125/290 for processing. The skill 125/290 may leverage LPD 241 corresponding to the set of identifiers 425 in executing the command or request embodied in the NLU data 435. The skill 125/290 may return output data 410 to the orchestrator 230. The orchestrator 230 may forward the output data 410 directly to the device 110, to another skill 125/290, or to the text-to-speech (TTS) component 280. The TTS component 280 may generate a spoken-word response to the user based on the output data 410, and provide it back to the orchestrator 230 in the form of output audio data 420, which may be forwarded to the device 110 for output.

Figure 5:
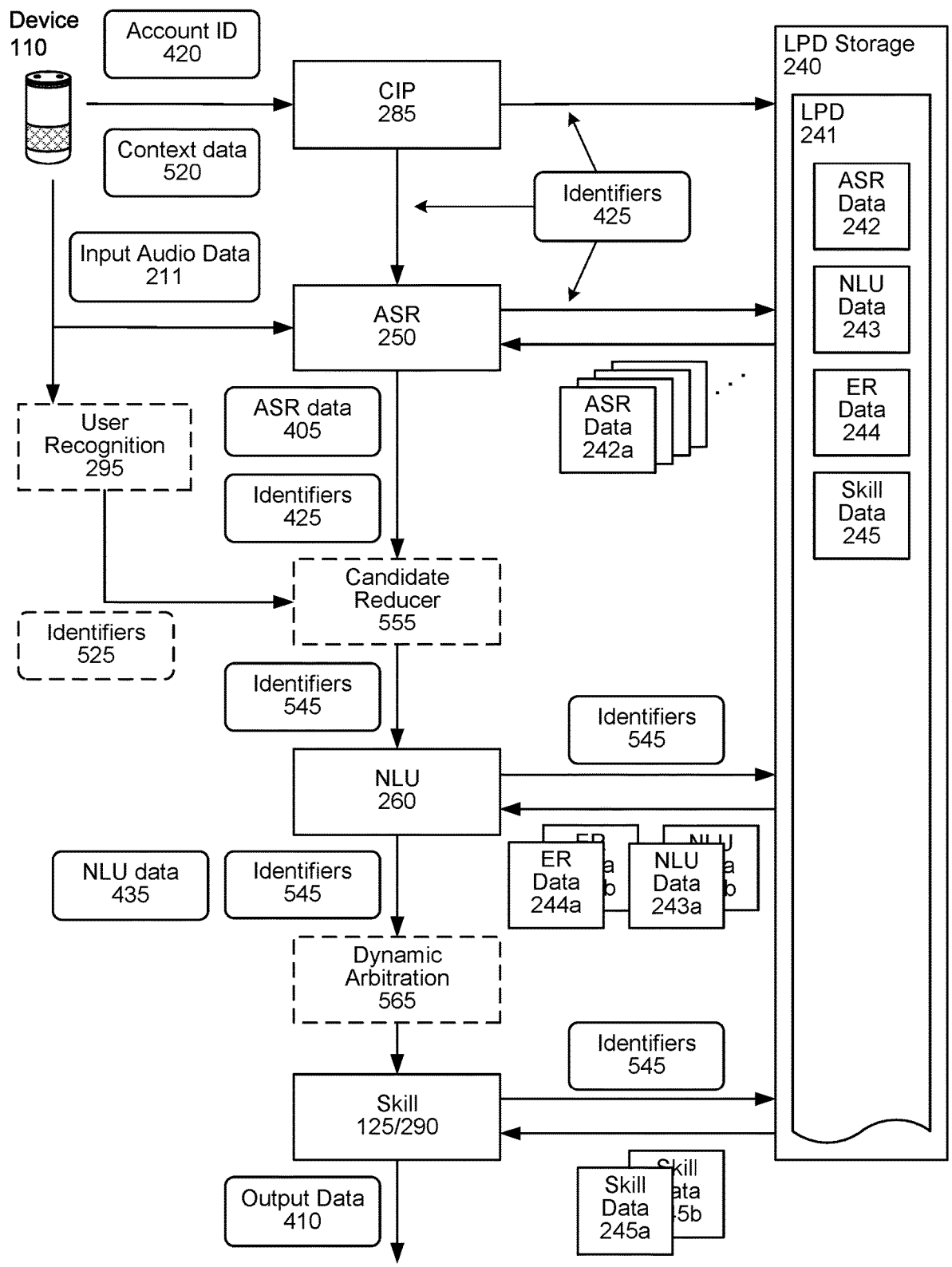
FIG. 5 is another conceptual diagram illustrating how a natural language input may be processed at runtime and illustrating the use of data associated with multiple language recognition contexts, according to embodiments of the present disclosure.

FIG. 5 is another conceptual diagram illustrating how a natural language input may be processed in a system 120 at runtime and illustrating the use of data associated with multiple language recognition contexts, according to embodiments of the present disclosure. FIG. 5 shows operation of the system based on an audio (spoken) input; however, text-based input implementations are possible. A device 110 receives a spoken word input from a user, and converts the received audio into input audio data 211. The device 110 additionally provides an account identifier 420. The account identifier 420 can be a household or group account to which the device 110 is registered. The device 110 may provide the account identifier 420 at runtime; alternatively, the system 120 may have received the account identifier 420 previously from the device 110 or elsewhere, such as a device registration web portal. A candidate identifies provider (CIP) 285 can receive the account identifier 420 and provide a set of identifiers 425. In some implementations, the CIP 285 can take into account context data 520 when providing the set of identifiers 425; for example, the CIP 285 may provide a different set of identifiers 425 for a given account identifier 420 depending on the time of day, or the detected presence of other users. In some implementations, context data 520 may come from the device 110 or from other components of the system 120. A language processing data (LPD) storage 240 can maintain a library of LPD 241. Each LPD 241 instance can be associated with an identifier. Each identifier in the set of identifiers 425 can correspond to an instance of the LPD 241. Thus, the set of identifiers 425 (and/or a subset of identifiers 545 can be used to retrieve or otherwise access the LPD 241 in various stages of the natural language processing.

An ASR component 250 can receive the input audio data 211 and the set of identifiers 425. The ASR component 250 can access ASR data 242 corresponding to each identifier in the set of identifiers 425. Further details of the operation of the ASR component 250 are described below with reference to FIG. 6. The ASR component 250 can output ASR output data 405.

In some implementations, a candidate reducing component 555, in conjunction with a user recognition component 295, can narrow the list of candidate users; that is, eliminate one or more identifiers from the set of identifiers 425. The user recognition component 295 can receive the input audio data 211, and return a single identifier or an n-best list of identifiers, possibly with a confidence value associated with each. In some implementations, the user recognition component 295 may base its determination on additional data, such as the set of identifiers 425 or other data related to the input audio data 211. The user recognition component 295 can output user recognition data including one or more user identifiers 525. The candidate reducing component 555 can receive the one or more user identifiers 525 and generate a subset of identifiers 545. The subset of identifiers 545 may contain a list of one or more identifiers common to both the user identifiers 525 and the set of identifiers 425. The subset of identifiers 545 may additionally include one or more group identifiers present in the set of identifiers 425. In some implementations, however, the user recognition component 295 may recognize a voice corresponding to a user not represented among the set of identifiers 425. In such case, the subset of identifiers 545 may include one or more identifiers not originally included in the set of identifiers 425. Such a situation can occur, for example, when a guest user that is known by the system is using the device 110 without logging in or otherwise registering with the device 110 first. In some implementations, the candidate reducing component 555 can use additional data for determining candidate identifiers. Such additional data can include results of a knowledge challenge (such as asking a particular question to verify the identity of the user), a possession challenge (using, for example, two-factor authorization or a one-time PIN to verify the identity of the user based on use of a trusted device), or a transaction risk management signal (e.g., a fraud detection signal).

An NLU component 260 can receive the ASR output data 405 and the subset of identifiers 545. The NLU component 260 can access NLU data 243 corresponding to each identifier in the subset of identifiers 545 (or the set of identifiers 425, if no candidate reduction has been performed). Further details of the operation of the NLU component 260 are described below with reference to FIG. 6. The NLU component 260 can output NLU data 435. The NLU processing may also include entity resolution (ER) based on the ER data 244 corresponding to the subset of identifiers 545.

In some cases, the NLU data 435 may include two equally or closely ranked hypothesis, one corresponding to a group identifier and one corresponding to a personal identifier. In other words, one hypothesis may correspond to a communal experience and the other to a personal experience. In such cases, the system 120 may employ a dynamic arbitration module 565 to select a hypothesis. The dynamic arbitration module 565 can select from among the competing hypotheses in the NLU data 435 based on environmental information such as the time of day, location of the device, the room (or house) in which the device is located, whether the receiving and/or the requested device is in the home or office, whether the device or user is currently in a car, the type of device, the presence or identities of one or more additional people in the room, etc. The system 120 can send NLU data 435 corresponding to the selected hypothesis to the skill 125/290 for execution. The skill 125/290 can also receive the subset of identifiers 545 (or the set of identifiers 425, if no candidate reduction has been performed), and access the corresponding skill data 245 from the LPD storage 240. The skill 125/290 can return output data 410, which may be provided to the device 110 for output to the user or otherwise used to act on the user's request.

Figure 6:
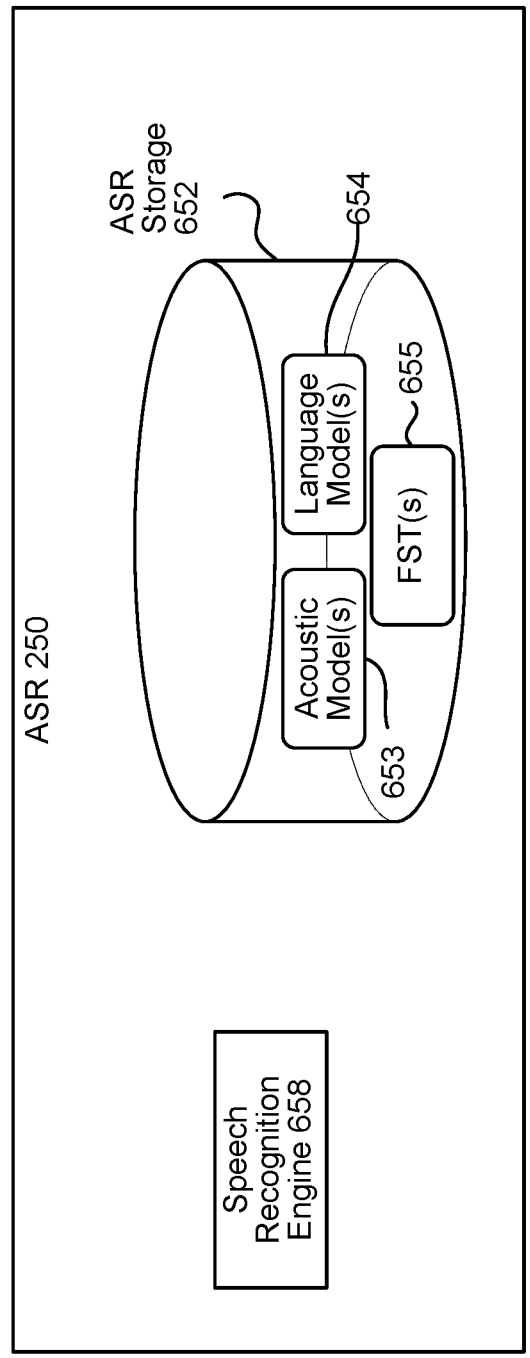
FIG. 6 is a conceptual diagram of ASR components, according to embodiments of the present disclosure.

FIG. 6 is a conceptual diagram of ASR components, according to embodiments of the present disclosure. The ASR component 250 may interpret a spoken natural language input based on the similarity between the spoken natural language input and pre-established language models 654 stored in an ASR storage 652. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 655 to implement the language model functions. The ASR component 250 can receive the set of identifiers 425 from the orchestrator 230, and use the set of identifiers 425 to select one or more FSTs 655 with which to process the spoken language input.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 653 stored in the ASR storage 652), and the likelihood that a particular word, which matches the sounds, would be included in the sentence at the specific location (e.g., using a language or grammar model 654). The ASR component 250 can use the set of identifiers 425 to select one or more acoustic models 653 and language models 654 with which to process the spoken language input. Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 658. The ASR component 250 receives audio data 211 (for example, received from a local device 110 having processed audio detected by a microphone by an acoustic front end (AFE) or other component). The speech recognition engine 658 compares the audio data 211 with acoustic models 653, language models 654, FST(s) 655, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 658 may process the audio data 211 with reference to information stored in the ASR storage 652. Feature vectors of the audio data 211 may arrive at the system 120 encoded, in which case they may be decoded prior to processing by the speech recognition engine 658.

The speech recognition engine 658 attempts to match received feature vectors to language acoustic units (e.g., phonemes) and words as known in the stored acoustic models 653, language models 654, and FST(s) 655. For example, the audio data 211 may be processed by one or more acoustic model(s) 653 to determine acoustic unit data. The acoustic unit data may include indicators of acoustic units (such as phonemes or other acoustic units) detected in the audio data 211 by the ASR component 250. The acoustic unit data may be processed using the language model 654 (and/or using FST 655) to determine text data/ASR output data 405. The ASR output data 405 may then be sent to further components (such as the NLU component 260) for further processing as discussed herein.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senon, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 658 may use a number of techniques to match feature vectors to phonemes or other acoustic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 7:
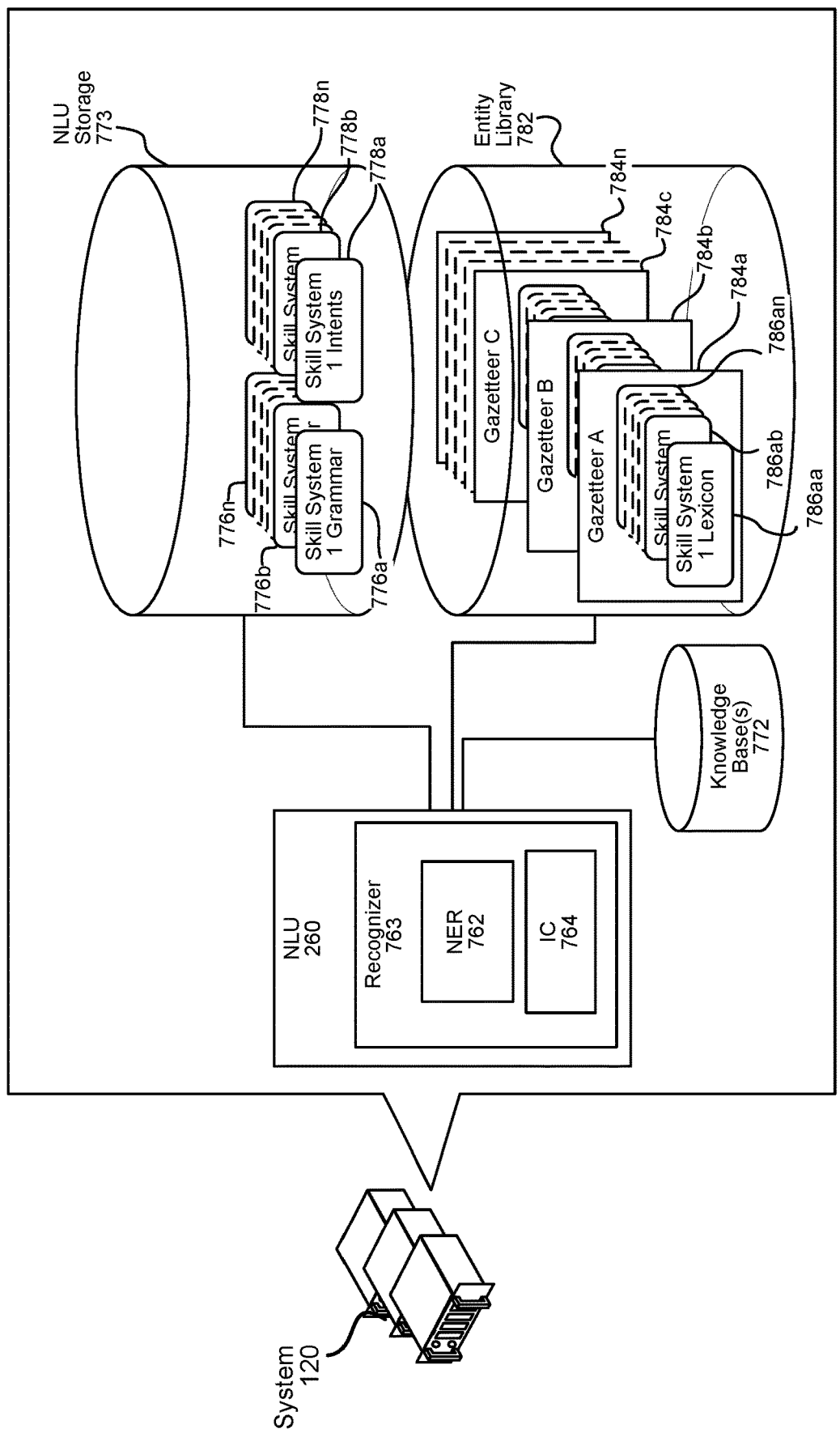
FIG. 7 is a conceptual diagram of how natural language processing is performed, according to embodiments of the present disclosure.
Figure 8:
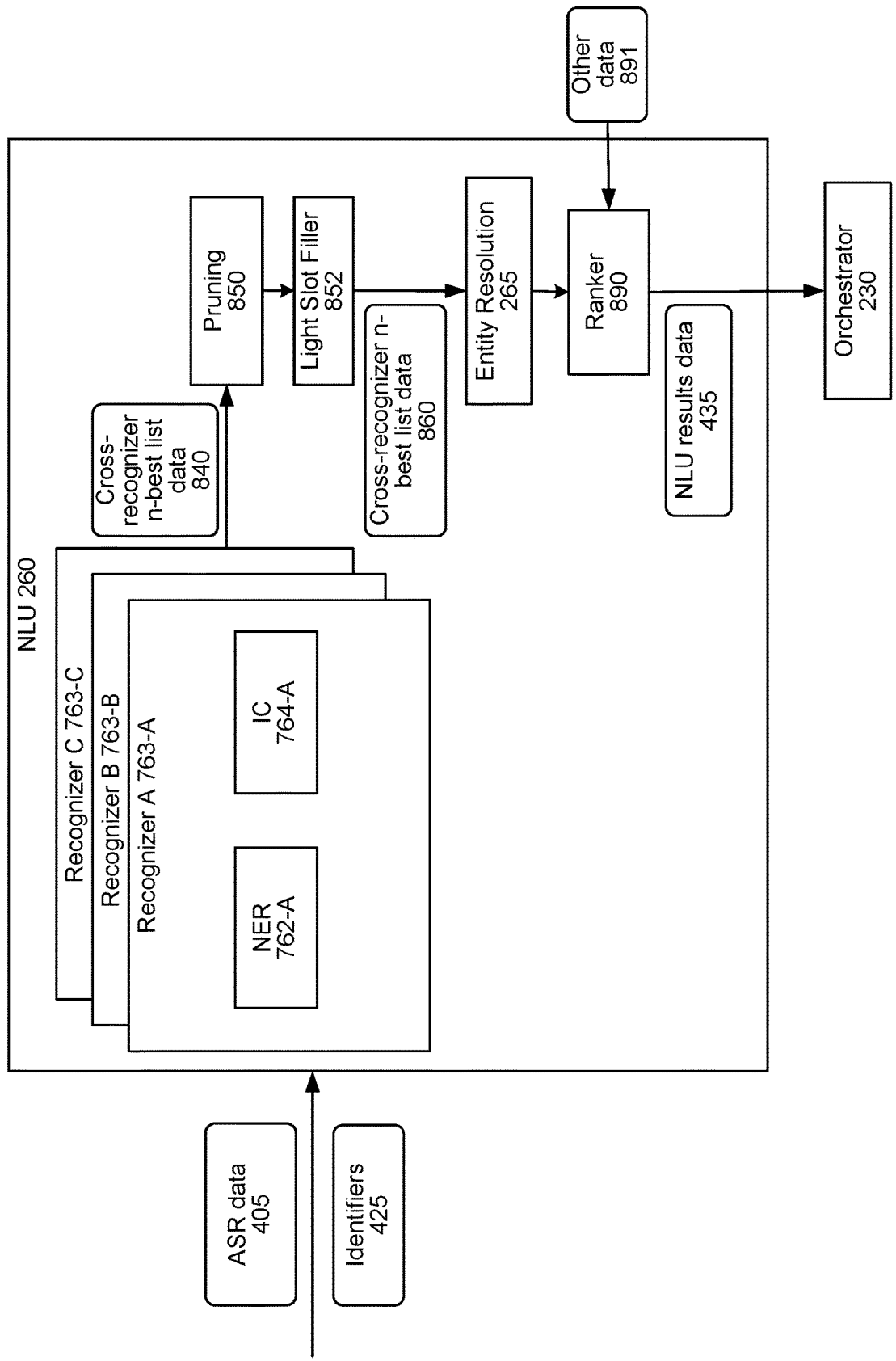
FIG. 8 is a conceptual diagram of how natural language processing is performed, according to embodiments of the present disclosure.

FIGS. 7 and 8 illustrates how the NLU component 260 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure. The NLU 260 can receive ASR output data 405 from the orchestrator 230 for processing. The NLU 260 can also receive the set of identifiers 425, which it can use to retrieve the corresponding LPD 241 or NLU data 243 including grammars, intents, lexicons, etc. The NLU component 260 may include one or more recognizers 763. In at least some embodiments, a recognizer 763 may be associated with a skill system 125 (e.g., the recognizer may be configured to interpret text data to correspond to the skill system 125). In at least some other examples, a recognizer 763 may be associated with a domain (e.g., the recognizer may be configured to interpret text data to correspond to the domain).

Recognizers 763 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 260 may communicate with various storages. The NLU component 260 may communicate with an NLU storage 773, which includes skill system grammars (776a-776n), representing how natural language inputs may be formulated to invoke skill systems 125, and skill system intents (778a-778n) representing intents supported by respective skill systems 125.

Each recognizer 763 may be associated with a particular grammar 776, a particular intent(s) 778, and a particular personalized lexicon 786 (stored in an entity library 782). A gazetteer 784 may include skill system-indexed lexical information associated with a particular user. For example, Gazetteer A (784a) may include skill system-indexed lexical information 786aa to 786an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 763 may include a NER component 762 that attempts to identify grammars and lexical information that may be used to construe meaning with respect to text data input therein. A NER component 762 identifies portions of text data that correspond to a named entity that may be recognizable by the system 120. A NER component 762 may also determine whether a word refers to an entity that is not explicitly mentioned in the text, for example "him," "her," "it" or other anaphora, exophora or the like.

A NER component 762 applies grammar models 776 and lexical information 786 associated with one or more skill systems 125 to determine a mention of one or more entities in text data input therein. In this manner, a NER component 762 identifies "slots" (i.e., particular words in text data) that may be needed for later processing. A NER component 762 may also label each slot with a type (e.g., noun, place, city, artist name, song name, etc.).

Each grammar model 776 may include the names of entities (i.e., nouns) commonly found in speech about a particular skill system 125 to which the grammar model 776 relates, whereas lexical information 786 may be personalized to the user identifier output by a user recognition component 295 for the natural language input. For example, a grammar model 776 associated with a shopping skill system may include a database of words commonly used when people discuss shopping.

A downstream process called named entity resolution actually links a portion of text data (identified by a NER component 762) to a specific entity known to the system 120. To perform named entity resolution, the NLU component 260 may use gazetteer information (784a-784n) stored in the entity library storage 782. The gazetteer information 784 may be used to match text data (identified by a NER component 762) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 763 may also include an IC component 764 that processes text data input thereto to determine an intent(s) of a skill system(s) 125 that potentially corresponds to the natural language input represented in the text data. An intent corresponds to an action to be performed that is responsive to the natural language input represented by the text data. An IC component 764 may communicate with a database 778 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 778 associated with the skill system(s) 125 that is associated with the recognizer 763 implementing the IC component 764.

The intents identifiable by a specific IC component 764 may be linked to one or more skill system-specific grammar frameworks 776 with "slots" to be filled. Each slot of a grammar framework 776 corresponds to a portion of text data that a NER component 762 believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 776 may not be structured as sentences, but rather based on associating slots with grammatical tags.

For example, a NER component 762 may identify words in text data as subject, object, verb, preposition, etc. based on grammar rules and/or models prior to recognizing named entities in the text data. An IC component 764 (implemented by the same recognizer 763) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in the text data the NER component 762 previously tagged as a grammatical object or object modifier with those identified in the lexicon 786.

A NER component 762 may perform semantic tagging, which is the labeling of a word or combination of words according to their type/semantic meaning. A NER component 762 may parse text data using heuristic grammar rules, or a model may be constructed using techniques such as hidden Markov models, maximum entropy models, log linear models, conditional random fields (CRF), and the like. For example, a NER component 762, implemented by a music skill system or music domain recognizer 763, may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 may identify "Play" as a verb based on a word database associated with the music skill system or music domain, which an IC component 764 may determine corresponds to a <PlayMusic> intent. At this stage, no determination has been made as to the meaning of "mother's little helper" and "the rolling stones," but based on grammar rules and models, the NER component 762 has determined that the text of these phrases relates to the grammatical object (i.e., entity).

The frameworks linked to the intent are then used to determine what database fields should be searched to determine the meaning of these phrases, such as searching a user's gazetteer 784 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (in the knowledge base 772). For example, if the text data corresponds to "play songs by the rolling stones," after failing to determine an album name or song name called "songs" by "the rolling stones," the NER component 762 may search a music skill system vocabulary for the word "songs." In the alternative, generic words may be checked before the gazetteer information, or both may be tried, potentially producing two different results.

A recognizer 763 may tag text data to attribute meaning thereto. For example, a recognizer 763 may tag "play mother's little helper by the rolling stones" as: {skill system} Music, {intent} Play Music, {artist name} rolling stones, {media type} SONG, and {song title} mother's little helper. For further example, a recognizer 763 may tag "play songs by the rolling stones" as: {skill system} Music, {intent} Play Music, {artist name} rolling stones, and {media type} SONG.

As described above, more than one recognizer 763 may process with respect to text data representing a single natural language input. In such instances, each recognizer 763 may output NLU hypothesis data including at least one NLU hypothesis including an intent indicator (determined by an IC component 764 of the recognizer 763) and at least one tagged named entity (determined by a NER component 762 of the recognizer 763).

The NLU component 260 may compile the NLU hypotheses (output by multiple recognizers 763) into cross-recognizer N-best list data 840. Each NLU hypothesis may be associated with a respective score indicating a likelihood that the NLU hypothesis corresponds to the domain, one or more skill systems 125, etc. associated with the recognizer 763 from which the NLU hypothesis was output. For example, the cross-recognizer N-best list data 840 may be represented as:

[0.95] Intent: <PlayMusic> ArtistName: Lady Gaga SongName: Poker Face
[0.70] Intent: <PlayVideo> ArtistName: Lady Gaga VideoName: Poker Face
[0.01] Intent: <PlayMusic> ArtistName: Lady Gaga AlbumName: Poker Face
[0.01] Intent: <PlayMusic> SongName: Pokerface with each line of the foregoing corresponding to a different NLU hypothesis and associated score.

The NLU component 260 may send the cross-recognizer N-best list data 840 to a pruning component 850, which sorts the NLU hypotheses, represented in the cross-recognizer N-best list data 840, according to their respective scores. The pruning component 850 may then perform score thresholding with respect to the cross-recognizer N-best list data 840. For example, the pruning component 850 may select NLU hypotheses, represented in the cross-recognizer N-best list data 840, associated with scores satisfying (e.g., meeting and/or exceeding) a threshold score. The pruning component 850 may additionally or alternatively perform number of NLU hypothesis thresholding. For example, the pruning component 850 may select a threshold number of top-scoring NLU hypotheses represented in the cross-recognizer N-best list data 840.

The pruning component 850 may generate cross-recognizer N-best list data 860 including the selected NLU hypotheses. The purpose of the pruning component 1050 is to create a reduced list of NLU hypotheses so that downstream, more resource intensive, processes may only operate on NLU hypotheses that most likely represent the natural language input.

The NLU component 260 may include a light slot filler component 852 that takes text from slots, represented in the NLU hypotheses output by the pruning component 850, and alter it to make the text more easily processed by downstream components. The light slot filler component 852 may perform low latency operations that do not involve heavy operations such as reference to a knowledge base. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-recognizer N-best list data 860.

The cross-recognizer N-best list data 860 may be sent to an entity resolution component 265. The entity resolution component 265 can apply rules or other instructions to standardize labels or tokens in the NLU hypotheses represented in the cross-recognizer N-best list data 860. The precise transformation may depend on the skill system 125, domain, etc. to which a NLU hypothesis relates. For example, for a travel skill system-specific NLU hypothesis, the entity resolution component 265 may transform text corresponding to "Boston airport" to the standard BOS three-letter code referring to the airport. The entity resolution component 265 can refer to a knowledge base that is used to specifically identify the precise entity referred to in each slot of each NLU hypothesis represented in the cross-recognizer N-best list data 860.

Specific intent/slot combinations may also be tied to a particular source, which may then be used to resolve the text. In the example "play songs by the stones," the entity resolution component 265 may reference a personal music catalog, Amazon Music account, a user profile, or the like. The entity resolution component 265 may output N-best list data, altered from the cross-recognizer N-best list data 860, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 265 that are each specific to one or more different skill systems 125, domains, etc.

The NLU component 260 may include a ranker component 890 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 890 may assign the first NLU hypothesis a higher score than a second NLU hypothesis including at least one slot that is unfilled/unresolved by the entity resolution component 265.

The ranker component 890 may apply re-scoring, biasing, or other techniques. To do so, the ranker component 890 may consider not only the data output by the entity resolution component 265, but may also consider other data 891. The other data 891 may include a variety of information.

For example, the other data 891 may include skill system 125 rating or popularity data. For example, if a skill system 125 has a high rating, the ranker component 890 may increase the score of a NLU hypothesis associated with that skill system 125, and vice versa.

The other data 891 may additionally or alternatively include information about skill systems 125 that have been enabled by the user that originated the natural language input. For example, the ranker component 890 may assign higher scores to NLU hypotheses associated with enabled skill systems 125 than NLU hypotheses associated with skill systems 125 that have not been enabled by the user.

The other data 891 may additionally or alternatively include data indicating system usage history (e.g., specific to the user), such as if the user, that originated the natural language input, regularly invokes a particular skill system 125 or does so at particular times of day. The other data 891 may additionally or alternatively include data indicating date, time, location, weather, type of device 110, user identifier, context, as well as other information. For example, the ranker component 890 may consider when any particular skill system 125 is currently active with respect to the present user and/or device 110 (e.g., music being output by the skill system 125, a game being executed by the skill system 125, etc.).

The ranker component 890 may output NLU results data 435 including one or more NLU hypotheses. The NLU component 260 may send the NLU results data 435 to the orchestrator 230. In some cases, the ranker component 890 may output NLU results data 435 that includes two closely or equally ranked hypotheses, one pertaining to a group identifier, and one pertaining to a personal identifier. In such cases, a dynamic arbitration mechanism can break the tie using environmental information to determine whether the input data has greater relevance to the group identifier or the personal identifier.

As described above, the system 120 may perform speech processing using two different components (e.g., the ASR component 250 and the NLU component 260). One skilled in the art will appreciate that the system 120, in at least some embodiments, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs NLU hypothesis data including a most likely NLU hypothesis, or multiple NLU hypotheses in the form of a lattice or an N-best list with individual NLU hypotheses corresponding to confidence scores or other scores (such as probability scores, etc.).

Figure 9:
FIG. 9 is a schematic diagram of an illustrative architecture in which sensor data is combined to recognize one or more users, in accordance with embodiments of the present disclosure.

As described above, the system 120 may include a user recognition component 295. The user recognition component 295 may recognize one or more users using a variety of data. As illustrated in FIG. 9, the user recognition component 295 may include one or more subcomponents including a vision component 908, an audio component 910, a biometric component 912, a radio frequency (RF) component 914, a learning component 916, and a recognition confidence component 918. In some instances, the user recognition component 295 may monitor data and determinations from one or more subcomponents to recognize an identity of one or more users associated with data input to the system 120. The user recognition component 295 may output user recognition data 995, which may include a user identifier associated with a user the user recognition component 295 believes originated data input to the system 120. The user recognition component 295 may be used to inform processes performed by various components of the system 120 as described herein.

The vision component 908 may receive data from one or more sensors capable of providing images (e.g., cameras) or sensors indicating motion (e.g., motion sensors). The vision component 908 can perform facial recognition or image analysis to determine an identity of a user and to associate that identity with a user profile associated with the user. In some instances, when a user is facing a camera, the vision component 908 may perform facial recognition and identify the user with a high degree of confidence. In other instances, the vision component 908 may have a low degree of confidence of an identity of a user, and the user recognition component 295 may use determinations from additional components to determine an identity of a user. The vision component 908 can be used in conjunction with other components to determine an identity of a user. For example, the user recognition component 295 may use data from the vision component 908 with data from the audio component 910 to identify what user's face appears to be speaking at the same time audio is captured by a device 110 the user is facing for purposes of identifying a user who spoke an input to the system 120.

The overall system of the present disclosure may include biometric sensors that transmit data to the biometric component 912. For example, the biometric component 912 may receive data corresponding to fingerprints, iris or retina scans, thermal scans, weights of users, a size of a user, pressure (e.g., within floor sensors), etc., and may determine a biometric profile corresponding to a user. The biometric component 912 may distinguish between a user and sound from a television, for example. Thus, the biometric component 912 may incorporate biometric information into a confidence level for determining an identity of a user. Biometric information output by the biometric component 912 can be associated with specific user profile data such that the biometric information uniquely identifies a user profile of a user.

The RF component 914 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 914 the strength of the signal (e.g., as a received signal strength indication (RSSI)). The RF component 914 may use the RSSI to determine an identity of a user (with an associated confidence level). In some instances, the RF component 914 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the NPL system 120 for purposes of the system 120 determining who spoke a particular input. Such a registration may occur prior to, during, or after speaking of an input.

The learning component 916 may track the behavior of various users as a factor in determining a confidence level of the identity of the user. By way of example, a user may adhere to a regular schedule such that the user is at a first location during the day (e.g., at work or at school). In this example, the learning component 916 would factor in past behavior and/or trends in determining the identity of the user that provided input to the system 120. Thus, the learning component 916 may use historical data and/or usage patterns over time to increase or decrease a confidence level of an identity of a user.

In at least some instances, the recognition confidence component 918 receives determinations from the various components 908, 910, 912, 914, and 916, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 995.

The audio component 910 may receive data from one or more sensors capable of providing an audio signal (e.g., one or more microphones) to facilitate recognition of a user. The audio component 910 may perform audio recognition on an audio signal to determine an identity of the user and associated user identifier. In some instances, aspects of the system 120 may be configured at a computing device (e.g., a local server). Thus, in some instances, the audio component 910 operating on a computing device may analyze all sound to facilitate recognition of a user. In some instances, the audio component 910 may perform voice recognition to determine an identity of a user.

The audio component 910 may also perform user identification based on audio data 211 input into the system 120 for speech processing. The audio component 910 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 910 may perform user recognition by comparing speech characteristics represented in the audio data 211 to stored speech characteristics of users (e.g., stored voice profiles associated with the device 110 that captured the spoken user input).

Figure 10:
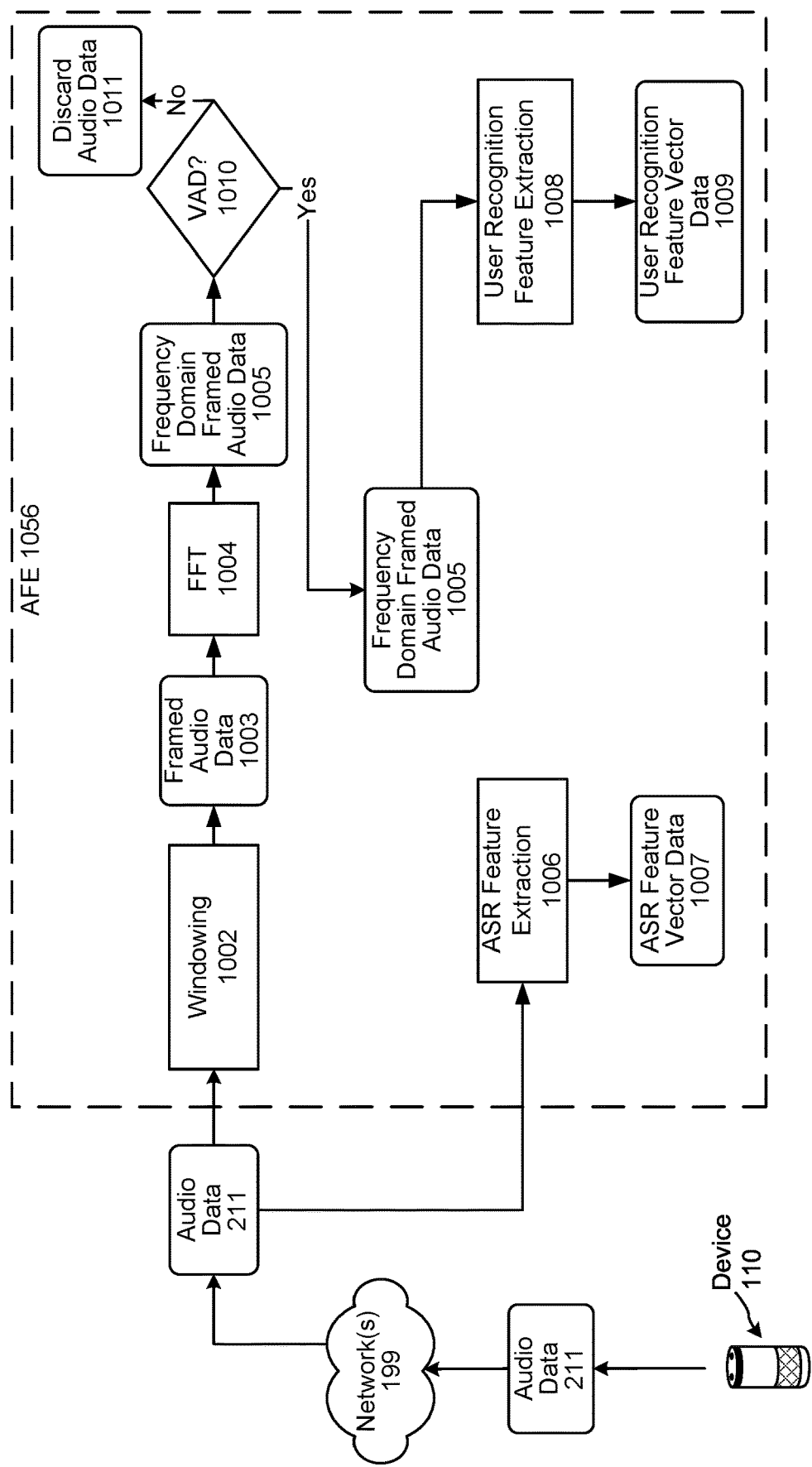
FIG. 10 is a flow diagram illustrating processing performed to prepare audio data for ASR processing and user recognition processing, in accordance with embodiments of the present disclosure.

FIG. 10 illustrates processing performed to prepare audio data for ASR processing and user recognition processing. As described, the device 110 sends audio data 211 through a network(s) 199 to the system 120 for processing. The system 120 may include an acoustic front end (AFE) 1056 (or other component(s)) that performs various functions on the audio data 211 to prepare the audio data 211 for further downstream processing, such as ASR processing and/or user recognition processing. For example, the AFE 1056 may perform (1002) windowing functions on the audio data 211 to create framed audio data 1003 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 1056 may then perform (1004) a fast Fourier transform (FFT) that converts the waveforms in each frame of the framed audio data 1003 from its original domain (e.g., time) to a representation in a frequency domain (thereby creating frequency domain framed audio data 1005). Audio processing techniques other than or in addition to FFT may be used to transform audio data (e.g., waveforms) into data that can be processed as needed.

The system 120 (through the AFE 1056 or using another component) then detects (1010) whether voice activity (i.e., speech) is present in the post-FFT waveforms (i.e., frequency domain framed audio data 1005). The VAD detector 1010 (or other components) may also be configured in a different order, for example the VAD detector 1010 may operate on audio data 211 rather than on frequency domain framed audio data 1005, may operate on ASR features, etc. Various different configurations of components are possible. If there is no speech in the audio data, the system 120 discards (1011) the frequency domain framed audio data 1005 (i.e., removes the audio data from the processing stream). If, instead, the system 120 detects speech in the frequency domain framed audio data 1005, the system 120 performs user recognition feature extraction (1008) on the frequency domain framed audio data 1005. User recognition feature extraction (1008) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1009). The feature extraction may continue until voice activity is no longer detected in the audio data, at which point the system 120 may determine that an endpoint of the speech has been reached.

ASR feature extraction (1006) may be performed on all the audio data 211 received from the device 110. Alternatively (not illustrated), ASR feature extraction (1006) may only be performed on audio data including speech (as indicated by the VAD 1010). ASR feature extraction (1006) and/or user recognition feature extraction (1008) involve determining values (i.e., features) representing qualities of the frequency domain framed audio data 1005, along with quantitating those features into values (i.e., feature vectors or audio feature vectors). ASR feature extraction (1006) may determine ASR feature vector data 1007 useful for ASR processing, and user recognition feature extraction (1008) may determine user recognition feature vector data 1009 (sometimes called an i-vector) useful for user recognition. The ASR feature vector data 1007 and the user recognition feature vector data 1009 may be the same feature vectors, different feature vectors, or may include some overlapping feature vectors. A number of approaches may be used to extract feature vectors from the frequency domain framed audio data 1005, such as MFCCs, PLP techniques, neural network feature vector techniques, linear discriminant analysis, semi-tied covariance matrices, or other approaches known to those skilled in the art.

ASR feature vector data 1007 may include a different audio feature vector for each audio frame. Thus, for one 25 ms long audio frame, the ASR feature extraction component 1006 may output a single ASR feature vector. The ASR feature vectors 1007 output by the ASR feature extraction component 1006 may be output to the ASR component 250.

Depending on system configuration, the user recognition feature extraction component 1008 may output multiple user recognition feature vectors, for example one such vector for each audio frame. Alternatively, the user recognition feature extraction component 1008 may continue to input the frequency domain framed audio data 1005 while the utterance is ongoing (e.g., before the endpoint of the speech is reached in the audio data 1005). While the audio data 1005 for the utterance is input, the user recognition feature extraction component 1008 may accumulate or otherwise combine the audio data 1005 as it comes in. That is, for a certain frame's worth of audio data 1005 that comes in, the user recognition feature extraction component 1008 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1008 may depend on what audio qualities are determined to be important for ultimate user recognition. Thus, the user recognition feature extraction component 1008 may be trained to isolate and process data that is most useful for user recognition. The output of the user recognition feature extraction component 1008 may thus include user recognition feature vector data 1009 that includes values for features useful for user recognition. The resulting user recognition feature vector data 1009 may then be used for user recognition.

Figure 11:
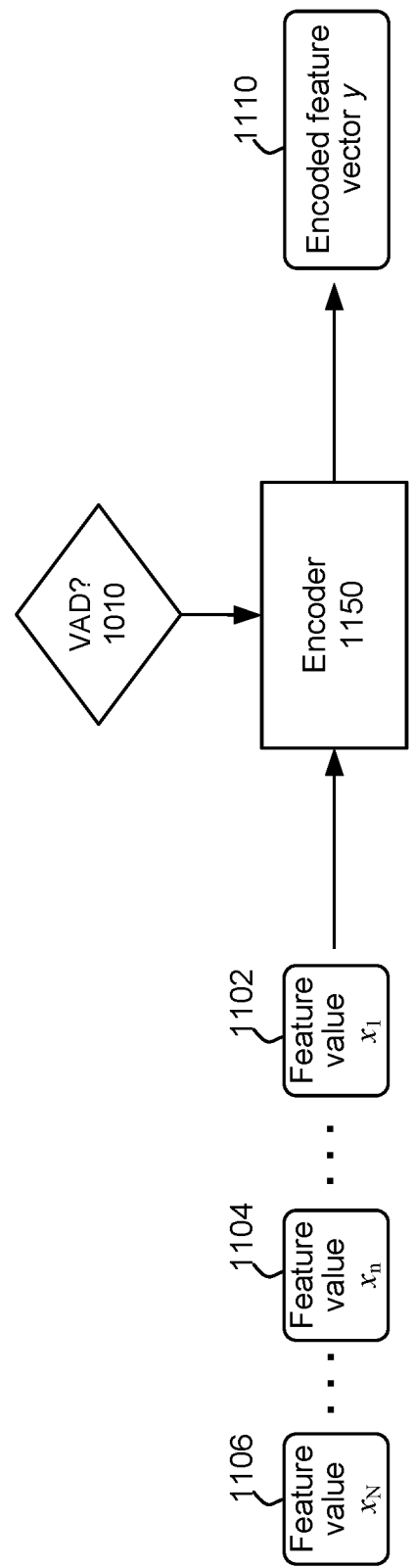
FIG. 11 is a diagram of a vector encoder, in accordance with embodiments of the present disclosure.

The user recognition feature vector data 1009 may include multiple vectors, each corresponding to different portions of the utterance. Alternatively, the user recognition feature vector data 1009 may be a single vector representing audio qualities of the utterance. Referring to FIG. 11, the single vector may be created using an encoder 1150 that can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 11, feature values 1102, 1104, and 1106 (which may include feature vectors of audio data 211, frequency domain framed audio data 1005, or the like) may be input into an encoder 1150 that will output an encoded feature vector 1110 that represents the input feature values. The VAD 1010 may be an input into the encoder 1150 such that the encoder 1150 may only operate when feature values input therein correspond to speech. The individual feature values (e.g., 1102, 1104, and 1106) may correspond to specific audio frames. Regardless of how many feature values are input, any particular encoder 1150 will be configured to output vectors of the same size, thus ensuring a continuity of output encoded vector size from any particular encoder 1150 (though different encoders may output vectors of different fixed sizes) and enabling comparison of different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 1150 may be implemented as a neural network (NN), recurrent neural network (RNN), GMM, or other model. One particular example is a long short-term memory (LSTM) RNN. There are a variety of ways for the encoder 1150 to consume the encoder input, including but not limited to:

linear, one direction (forward or backward),
 bi-linear, essentially the concatenation of a forward and a backward embedding, or
 tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 11 illustrates operation of the encoder 1150. The input feature value sequence, starting with feature value $x_1$ 1102, continuing through feature value $x_n$ 1104, and concluding with feature value $x_N$ 1106 is input into the encoder 1150. The encoder 1150 may process the input feature values as noted above. The encoder 1150 outputs the encoded feature vector y 1110, which is a fixed length feature vector of length F. Thus, the user recognition feature extraction component 1108 may include an encoder 1150 that receives audio feature values for a particular utterance as input, and outputs a fixed length encoded feature vector y 1110, which may be the user recognition feature vector data 1009. Thus, in certain system configurations, no matter how long the utterance is, or how many acoustic frames worth of feature values are input into the encoder 1150, the output feature vector 1110/1009 will be of the same length, thus allowing for more ease of performing user recognition by the user recognition component 295. To allow for robust system operation, a final vector 1110/1009 may include many dimensions (e.g., several hundred), thus providing many data points for downstream consideration.

To determine the user recognition feature vector data 1009, the system may (for example using the VAD detector 1010) determine that voice activity is detected in input audio. This may indicate the beginning of the utterance, thus resulting in the system determining that the input utterance starts at a first point in audio data. Audio processing (for example by windowing 1002, FFT 1004, ASR feature extraction 1006, user recognition feature extraction 1008, ASR processing, or the like) may continue on the utterance audio data starting at the first point and continuing until the VAD detector 1010 determines that voice activity is no longer detected at a second point in audio data. Thus, the system may determine that the input utterance ends at the second point. Thus, the first point may be considered the beginpoint of the utterance and the second point may be considered the endpoint of the utterance. The VAD detector 1010, or other component, may signal the user recognition feature extraction component 1008 when the beginpoint and/or endpoint is detected so that the user recognition feature extraction component 1008 may begin processing audio data starting at the beginpoint and ending at the endpoint. Further, audio frames during the utterance that do not include speech may be filtered out by the VAD detector 1010 and thus not considered by the ASR feature extraction component 1006 and/or user recognition feature extraction component 1008. The resulting accumulated/processed speech audio data for the utterance (from beginpoint to endpoint) may then be represented in a single feature vector for the user recognition feature vector data 1009, which may then be used for user recognition.

Figure 12:
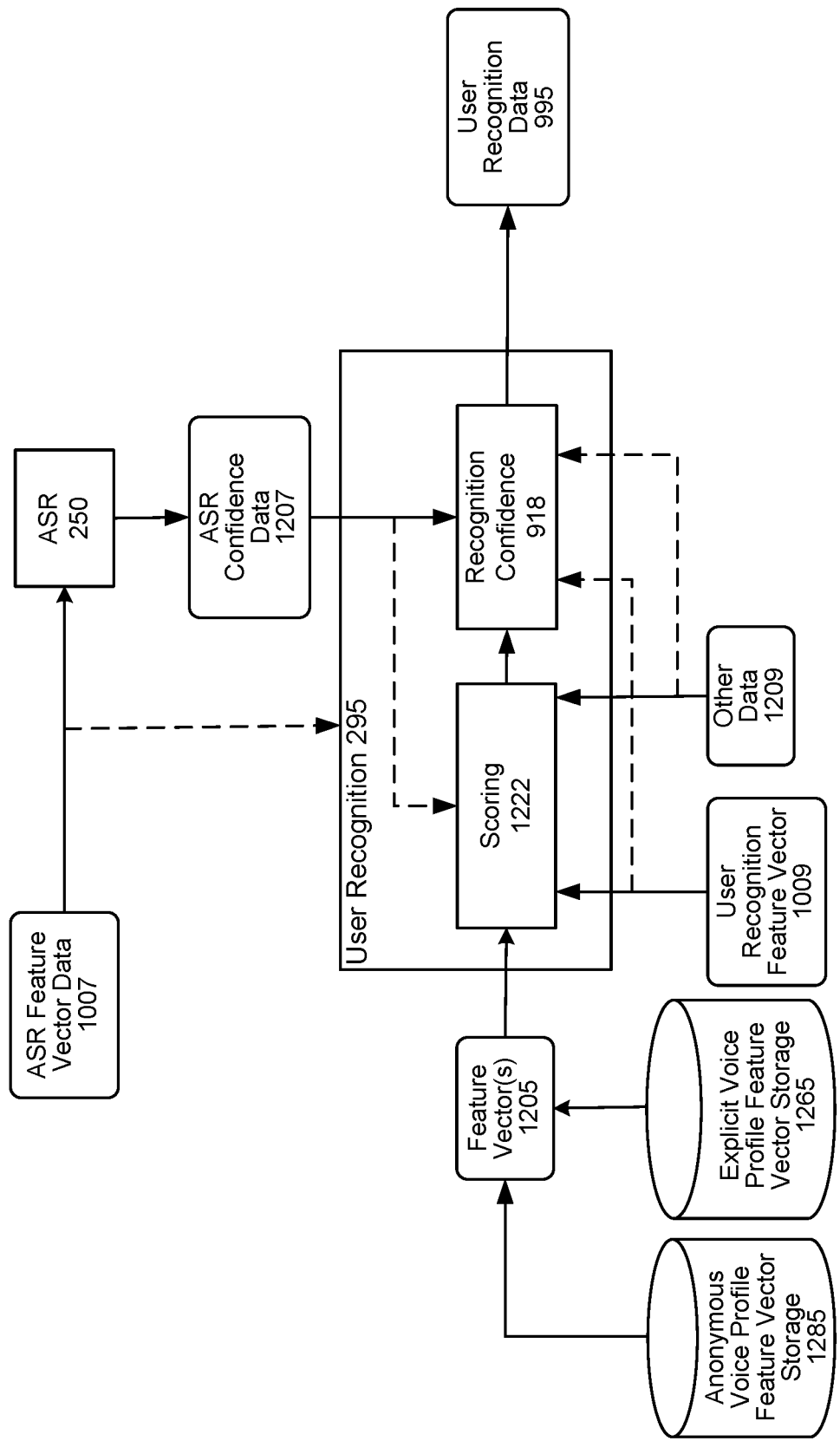
FIG. 12 is a system flow diagram illustrating user recognition processing, in accordance with embodiments of the present disclosure

FIG. 12 illustrates user recognition as performed by the user recognition component 295. The ASR component 250 performs ASR on the ASR feature vector data 1007 as described above. ASR confidence data 1207 is passed to the user recognition component 295.

The user recognition component 295 performs user recognition using various data including the user recognition feature vector data 1009, feature vectors 1205 representing explicit and/or anonymous voice profiles, the ASR confidence data 1207, and other data 1209. The user recognition component 295 may then output user recognition confidence data 995, which reflects a certain confidence that the user input was spoken by one or more particular users. The user recognition confidence data 995 may include one or more user identifiers, one or more user profile identifiers, one or more explicit voice profile identifiers, and/or one or more anonymous voice profile identifiers. Each identifier in the user recognition confidence data 995 may be associated with a respective confidence value, representing a likelihood that the user input corresponds to the identifier. A confidence value may be a numeric or binned value.

A system may be configured to identify a user based on the user explicitly enrolling in the system's user recognition functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech in the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

A user may provide a system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identical speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile.

The feature vector(s) 1205 input to the user recognition component 295 may correspond to one or more anonymous voice profiles (stored in anonymous voice profile feature vector storage 1285) and/or one or more explicit voice profiles (stored in explicit voice profile feature vector storage 1265). The user recognition component 295 may compare the feature vector(s) 1205 against the user recognition feature vector 1009, representing the present user input, to determine whether the user recognition feature vector 1009 corresponds to one or more of the feature vectors 1205 of the anonymous and/or explicit voice profiles.

Each feature vector 1205 may be the same size as the user recognition feature vector 1009. Thus, for example, if the user recognition feature vector 1009 is of size F (for example encoded by the encoder 1150), a feature vector 1205 may also be of size F.

To perform user recognition, the user recognition component 295 may determine the device 110 from which the audio data 211 originated. For example, the audio data 211 may be associated with metadata including a device identifier representing the device 110. Either the device 110 or the system 120 may generate the metadata. The system 120 may determine a group profile identifier associated with the device identifier, may determine user profile identifiers associated with the group profile identifier, and may include the group profile identifier and/or the user profile identifiers in the metadata. The system 120 may associate the metadata with the user recognition feature vector 1009 produced from the audio data 211. The user recognition component 295 may send query the anonymous voice profile feature vector storage 1285 and/or the explicit voice profile feature vector storage 1265 for feature vectors 1205 associated with the device identifier, the group profile identifier, and/or the user profile identifiers represented in the metadata. This limits the universe of possible feature vectors 1205 the user recognition component 295 considers at runtime and thus decreases the amount of time to perform user recognition by decreasing the amount of feature vectors 1205 needed to be processed. Alternatively, the user recognition component 295 may access all (or some other subset of) feature vectors 1205 available to the user recognition component 295. However, accessing all feature vectors 1205 will likely increase the amount of time needed to perform user recognition based on the magnitude of feature vectors to be processed.

The user recognition component may attempt to identify the user that spoke the speech represented in the audio data 211 by comparing the user recognition feature vector 1009 to the received feature vector(s) 1205. The user recognition component 295 may include a scoring component 1222 that determines respective scores indicating whether the user input (represented by the user recognition feature vector 1009) was spoken by one or more particular users (represented by the feature vector(s) 1205). The user recognition component 295 may also include a confidence component 918 that determines an overall accuracy of user recognition operations (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 1222 and confidence component 918 may be combined into a single component or may be separated into more than two components.

The scoring component 1222 and confidence component 918 may implement one or more trained machine learning models (such neural networks, classifiers, etc.) as known in the art. For example, the scoring component 1222 may use probabilistic linear discriminant analysis (PLDA) techniques. PLDA scoring determines how likely it is that the user recognition feature vector 1009 corresponds to a particular feature vector 1205. The PLDA scoring may generate a confidence value for each feature vector 1205 considered and may output a list of confidence values associated with respective user profile identifiers, anonymous voice profile identifiers, and/or explicit voice profile identifiers. The scoring component 1222 may also use other techniques, such as GMMs, generative Bayesian models, or the like, to determine confidence values.

The confidence component 918 may input various data including information about the ASR confidence 1207, speech length (e.g., number of frames or time of the user input), audio condition/quality data (such as signal-to-interference data or other metric data), fingerprint data, image data, or other factors to consider how confident the user recognition component 295 is with regard to the confidence values linking users to the user input. The confidence component 918 may also consider the confidence values and associated identifiers output by the scoring component 1222. Thus, the confidence component 918 may determine that a lower ASR confidence 1207, or poor audio quality, or other factors, may result in a lower confidence of the user recognition component 295. Whereas a higher ASR confidence 1207, or better audio quality, or other factors, may result in a higher confidence of the user recognition component 295. Precise determination of the confidence may depend on configuration and training of the confidence component 918 and the models implemented thereby. The confidence component 918 may operate using a number of different machine learning models/techniques such as GMM, neural networks, etc. For example, the confidence component 918 may be a classifier configured to map a score output by the scoring component 1222 to a confidence value.

The user recognition component 295 may output user recognition confidence data 995 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user recognition component 295 may output user recognition confidence data 995 with respect to each received feature vector 1205. The user recognition confidence data 995 may include numeric confidence values (e.g., 0.0-1.0, 0-1000, or whatever scale the system is configured to operate). Thus, the user recognition confidence data 995 may output an N-best list of potential users with numeric confidence values (e.g., user profile identifier 123-0.2, anonymous voice profile identifier 234-0.8). Alternatively or additionally, the user recognition confidence data 995 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user recognition component 295 may output an N-best list of potential users with binned confidence value (e.g., user profile identifier 123—low, anonymous voice profile identifier 234—high). Combined binned and numeric confidence value outputs are also possible. Rather than a list of identifiers and their respective confidence values, the user recognition confidence data 995 may only include information related to the top scoring identifier as determined by the user recognition component 295. The user recognition component 295 may also output an overall confidence value that the individual confidence values are correct, where the overall confidence value indicates how confident the user recognition component 295 is in the output results. The overall confidence value may be determined by the confidence component 918.

The confidence component 918 may determine differences between individual confidence values when determining the user recognition confidence data 995. For example, if a difference between a first confidence value and a second confidence value is large (and, optionally) the first confidence value is above a threshold confidence value), then the user recognition component 295 is able to recognize a first user (associated with the feature vector 1205 associated with the first confidence value) as the user that spoke the user input with a much higher confidence than if the difference between the confidence values were smaller.

The user recognition component 295 may perform thresholding to avoid incorrect user recognition results being output. For example, the user recognition component 295 may compare a confidence value output by the confidence component 918 to a threshold confidence value. If the confidence value does not satisfy (e.g., does not meet or exceed) the threshold confidence, the user recognition component 295 may not output user recognition confidence data 995, or may only include in that data 995 an indication that a user speaking the user input could not be recognized. Further, the user recognition component 295 may not output user recognition confidence data 995 until enough user recognition feature vector data 1009 is accumulated and processed to verify a user above a threshold confidence. Thus, the user recognition component 295 may wait until a sufficient threshold quantity of audio data of the user input has been processed before outputting user recognition data 995. The quantity of received audio data may also be considered by the confidence component 918. The user recognition component 295 can, for example, output the user recognition data 995 to the candidate reducer, which can use the user recognition data 995 to narrow the set of identities to a smaller subset of identifiers 545 to streamline downstream processing.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1205, the system may not be able to effectively determine which user originated the user input. In this situation, the user recognition component 295 may be configured to override its default setting and output numeric confidence values. This enables the system to determine a user associated with the highest numeric confidence value originated the user input.

The user recognition component may use other data 1209 to inform user recognition processing. Thus, a trained model or other component of the user recognition component 295 may be trained to take other data 1209 as an input feature when performing user recognition. The other data 1209 may include a wide variety of data types depending on system configuration and may be made available from other sensors, devices, or storage. The other data 1209 may include a time of day at which the audio data 211 was generated by the device 110 or received from the device 110, a day of a week in which the audio data 211 was generated by the device 110 or received from the device 110, etc.

The other data 1209 may include image data and/or video data. For example, facial recognition may be performed on image data and/or video data received from the device 110 from which the audio data 211 was received (or another device). Facial recognition may be performed by the user recognition component 295, or another component of the system 120. The output of facial recognition processing may be used by the user recognition component 295. That is, facial recognition output data may be used in conjunction with the comparison of the user recognition feature vector 1009 and one or more feature vectors 1205 to perform more accurate user recognition.

The other data 1209 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1209 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 1209 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 211 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may be associated with one or more respective users.

The other data 1209 may include additional data representing activity of a particular user that may be useful in performing user recognition. For example, if a user has recently entered a code to disable a home security alarm, and the audio data 211 was received from a device 110 represented in a group profile associated with the home, signals from the home security alarm about the disabling user, time of disabling, etc. may be reflected in the other data 1209 and considered by the user recognition component 295. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1209 and considered by the user recognition component 295.

Depending on system configuration, the other data 1209 may be configured to be included in the user recognition feature vector data 1009 (for example using the encoder 1150) so that all the data relating to the user input to be processed by the scoring component 1222 may be included in a single feature vector. Alternatively, the other data 1209 may be reflected in one or more different data structures to be processed by the scoring component 1222.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The user recognition component 295 may use one or more different types of user recognition processing (e.g., as described with respect to FIG. 9) depending on the data available to the user recognition component 295 and/or a recognition condition (e.g., threshold recognition confidence level) that needs to be satisfied. In some examples, simply performing one type of user recognition processing may be sufficient. In other examples, two or more different types of user recognition processing may be necessary to recognition the user to a degree satisfying the recognition condition.

Figure 13:
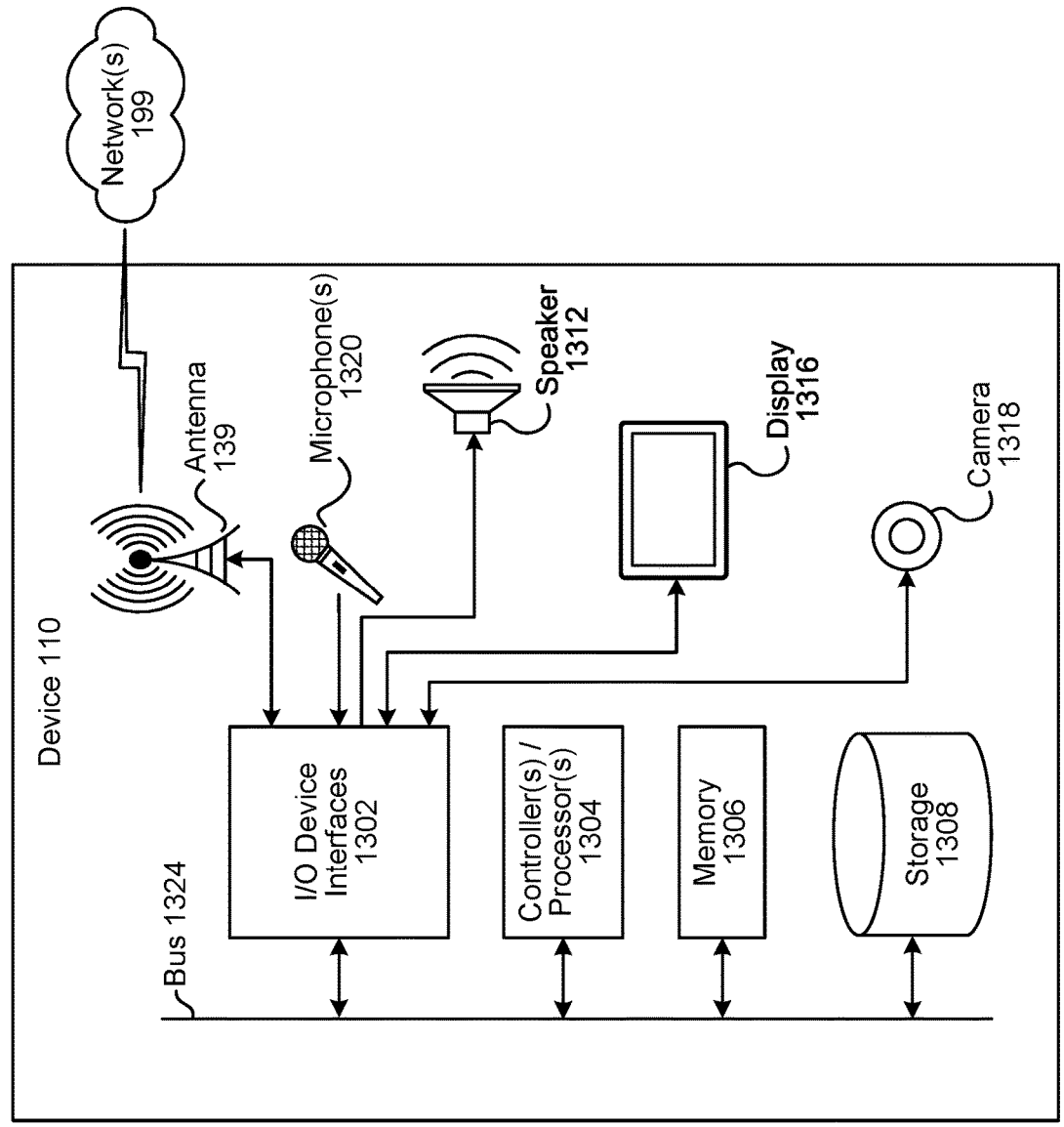
FIG. 13 is a block diagram conceptually illustrating example components of a device, in accordance with embodiments of the present disclosure.
Figure 14:
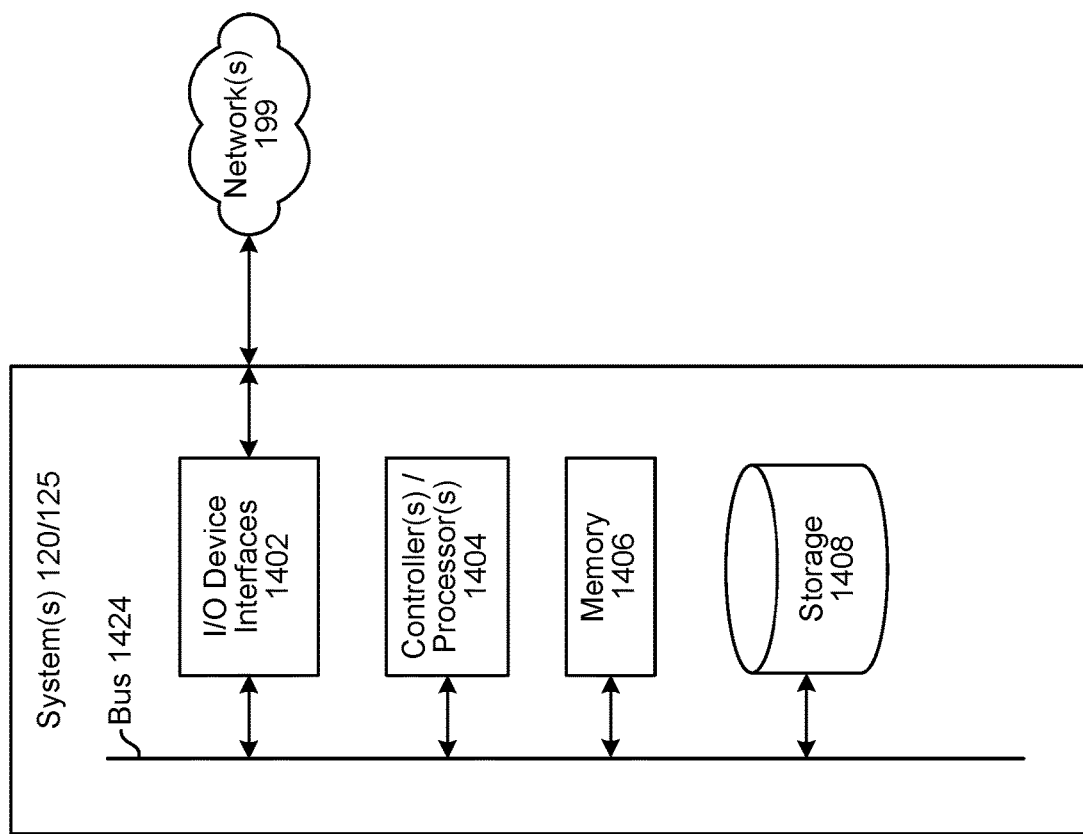
FIG. 14 is a block diagram conceptually illustrating example components of a system, in accordance with embodiments of the present disclosure.

FIG. 13 is a block diagram conceptually illustrating a device 110 that may be used with the system. FIG. 14 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 139, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1302/1402), processor(s) (1304/1404), memory (1306/1406), and/or storage (1308/1408) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 15:
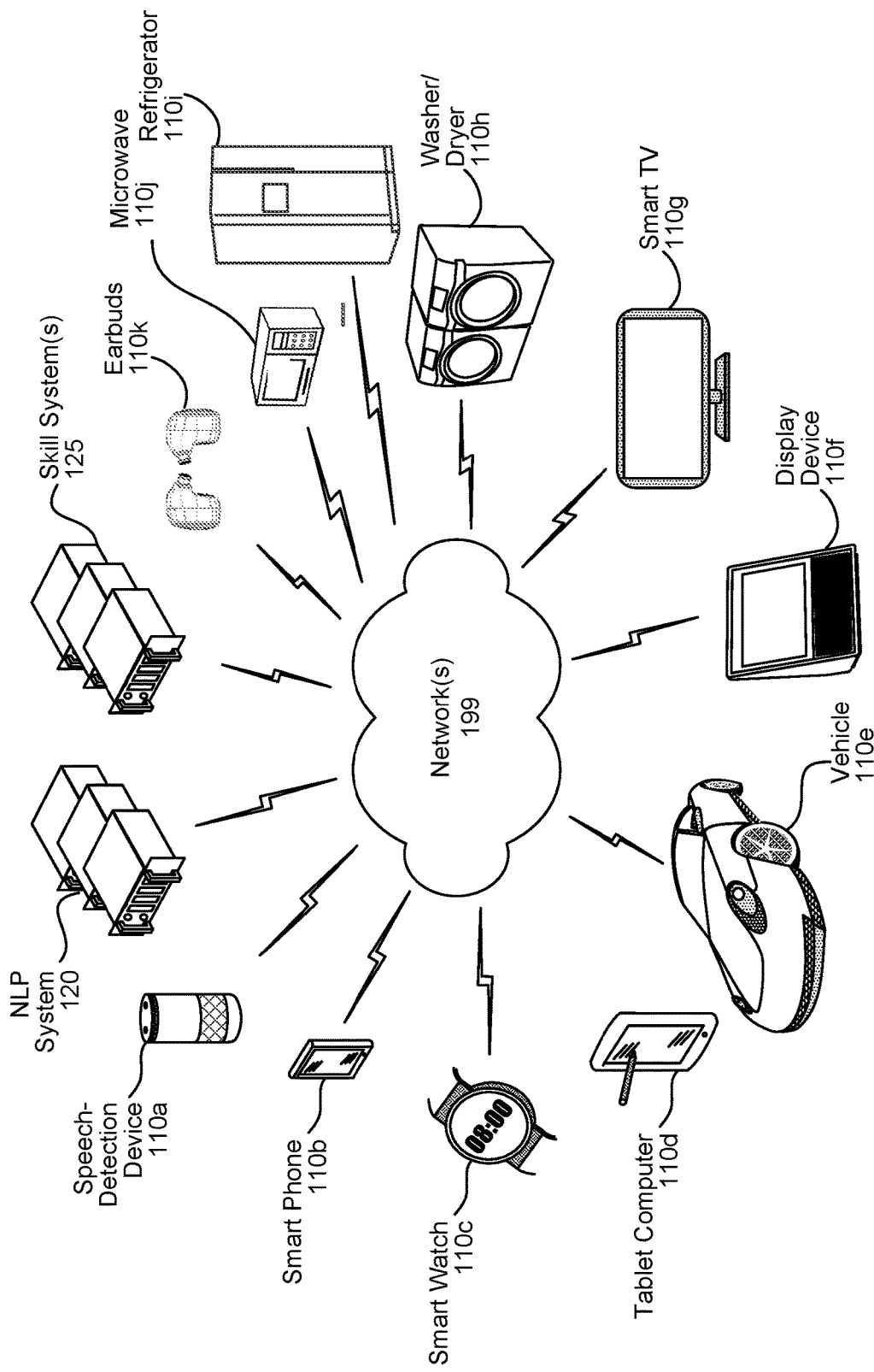
FIG. 15 illustrates an example of a computer network for use with the overall system, in accordance with embodiments of the present disclosure.

As illustrated in FIG. 15, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a microwave 110j and/or earbuds 110k, may be connected to the network(s) 199 through a wireless service provider, over a Wi-Fi, Bluetooth, or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving, by a language processing component from a first device, input data corresponding to a natural language input;
   receiving, from a second device, first context data corresponding to the input data, the first context data representing a device identifier corresponding to the second device;
   processing the first context data to determine a first identifier corresponding to a first possible user of the first device; and
   performing, by the language processing component based on to the first identifier, first language processing on the input data to generate output data.

2. The computer-implemented method of claim 1, further comprising:
   determining a first automatic speech recognition (ASR) configuration corresponding to the first identifier,
   wherein performing the first language processing comprises using the first ASR configuration.

3. The computer-implemented method of claim 1, further comprising:
   determining a first natural language understanding (NLU) configuration corresponding to the first identifier,
   wherein performing the first language processing comprises using the first NLU configuration.

4. The computer-implemented method of claim 1, further comprising:
   determining first entity data corresponding to the first identifier,
   wherein performing the first language processing comprises using the first entity data.

5. The computer-implemented method of claim 1, further comprising:
   determining, based at least in part on the first context data, that the first possible user is proximate to the first device.

6. The computer-implemented method of claim 1, wherein performing the first language processing comprising:
   determining a first hypothesis corresponding to the natural language input;
   determining a second hypothesis corresponding to the natural language input; and
   based at least in part on the first identifier, selecting the first hypothesis.

7. The computer-implemented method of claim 1, wherein the second device comprises a wearable device and receiving the first context data comprises receiving a signal corresponding to the wearable device.

8. The computer-implemented method of claim 1, further comprising:
receiving second context data corresponding to the input data;
determining, based on the second context data, a second identifier corresponding to a second possible user of the first device; and
based at least in part on the input data, determining the first possible user more likely provided the natural language input than the second possible user.

9. The computer-implemented method of claim 1, further comprising:
determining, based at least in part on the first context data, that the first device detects only a single user proximate to the first device.

10. The computer-implemented method of claim 1, wherein the input data is audio data corresponding to an utterance and wherein the method comprising:
processing the audio data to determine a voice identifier corresponding to the input data; and
determining that the voice identifier corresponds to a second identifier different from the first identifier, wherein performing the first language processing is additionally based on the second identifier.

11. A system, comprising:
at least one processor; and
at least one memory comprising instructions that, when executed by the at least one processor, cause the system to:
receive, by at least one language processing component corresponding to a first device, input data corresponding to a natural language input;
receive, from a second device, first context data corresponding to the input data, the first context data representing a device identifier corresponding to the second device;
processing the first context data to determine a first identifier corresponding to a first possible user of the first device; and
perform, by the at least one language processing component based on to the first identifier, first language processing on the input data to generate output data.

12. The system of claim 11, wherein the at least one memory further comprises instructions that, when executed by the at least one processor, further cause the system to:
determine a first automatic speech recognition (ASR) configuration corresponding to the first identifier,
wherein the instructions that cause the system to perform the first language processing comprise instructions that, when executed by the at least one processor, cause the system to use the first ASR configuration.

13. The system of claim 11, wherein the at least one memory further comprises instructions that, when executed by the at least one processor, further cause the system to:
determine a first natural language understanding (NLU) configuration corresponding to the first identifier,
wherein the instructions that cause the system to perform the first language processing comprise instructions that, when executed by the at least one processor, cause the system to use the first NLU configuration.

14. The system of claim 11, wherein the at least one memory further comprises instructions that, when executed by the at least one processor, further cause the system to:
determine first entity data corresponding to the first identifier,
wherein the instructions that cause the system to perform the first language processing comprise instructions that, when executed by the at least one processor, cause the system to use the first entity data.

15. The system of claim 11, wherein the at least one memory further comprises instructions that, when executed by the at least one processor, further cause the system to:
determine, based at least in part on the first context data, that the first possible user is proximate to the first device.

16. The system of claim 11, wherein the instructions that cause the system to perform the first language processing comprise instructions that, when executed by the at least one processor, cause the system to:
determine a first hypothesis corresponding to the natural language input;
determine a second hypothesis corresponding to the natural language input; and
based at least in part on the first identifier, select the first hypothesis.

17. The system of claim 11, wherein the second device comprises a wearable device and the instructions that cause the system to receive the first context data comprise instructions that, when executed by the at least one processor, cause the system to receive a signal corresponding to the wearable device.

18. The system of claim 11, wherein the at least one memory further comprises instructions that, when executed by the at least one processor, further cause the system to:
receive second context data corresponding to the input data;
determine, based on the second context data, a second identifier corresponding to a second possible user of the first device; and
based at least in part on the input data, determine the first possible user more likely provided the natural language input than the second possible user.

19. The system of claim 11, wherein the at least one memory further comprises instructions that, when executed by the at least one processor, further cause the system to:
determine, based at least in part on the first context data, that the first device detects only a single user proximate to the first device.

20. The system of claim 11, wherein the input data is audio data corresponding to an utterance and the at least one memory further comprises instructions that, when executed by the at least one processor, further cause the system to:
process the audio data to determine a voice identifier corresponding to the input data; and
determine that the voice identifier corresponds to a second identifier different from the first identifier, wherein performing the first language processing is additionally based on the second identifier.

* * * * *